(12) United States Patent
Sumiyoshi

(10) Patent No.: US 9,791,681 B2
(45) Date of Patent: Oct. 17, 2017

(54) OPTICAL ELEMENT AND DISPLAY APPARATUS

(71) Applicant: NLT Technologies, Ltd., Kanagawa (JP)

(72) Inventor: Ken Sumiyoshi, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 15/178,948

(22) Filed: Jun. 10, 2016

(65) Prior Publication Data

US 2016/0363744 A1    Dec. 15, 2016

(30) Foreign Application Priority Data

Jun. 10, 2015  (JP) ................ 2015-117555

(51) Int. Cl.
*G02B 5/08*  (2006.01)
*G02B 17/00* (2006.01)
*G02B 27/22* (2006.01)

(52) U.S. Cl.
CPC ....... *G02B 17/002* (2013.01); *G02B 27/2235* (2013.01)

(58) Field of Classification Search
CPC .. G02B 17/002; G02B 27/2235; G02B 27/22; G02B 5/04; G02B 7/181
USPC ................................... 359/855, 834
See application file for complete search history.

(56) References Cited

U.S. PATENT DOCUMENTS 6,959,990 B2 * 11/2005 Penn .................. G02B 5/04
                                                   359/834
2014/0254009 A1   9/2014 Otsubo

FOREIGN PATENT DOCUMENTS

WO    WO 2013/061619    5/2013

* cited by examiner

*Primary Examiner* — Euncha Cherry
(74) *Attorney, Agent, or Firm* — Young & Thompson

(57) ABSTRACT

An optical element is configured by connecting a plurality of tiles each constituted by a plurality of reflective optical elements, and is formed in a shape having a plane surface. The tiles configuring the optical element are formed such that outer shapes on the plane surface of the tiles have at least two different triangular shapes, while an end surface of each tile is provided with a light shielding part.

9 Claims, 20 Drawing Sheets

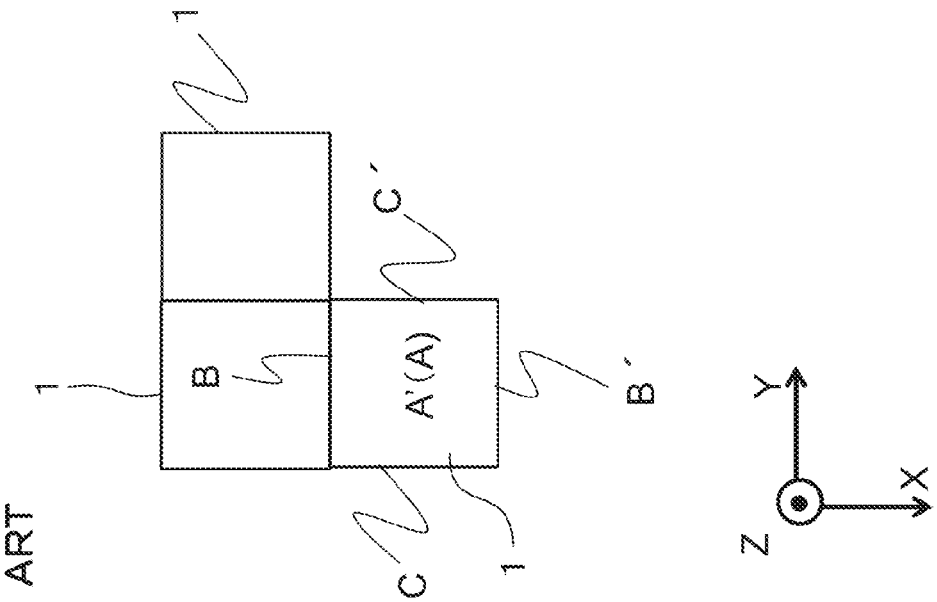
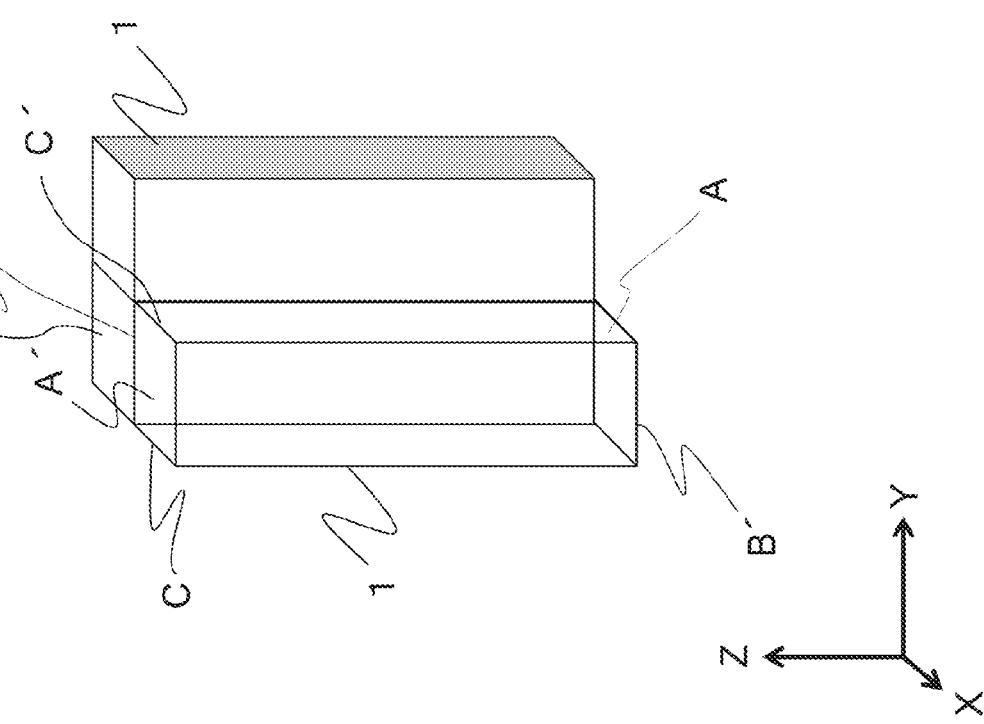
FIG. 1A RELATED ART
FIG. 1B RELATED ART

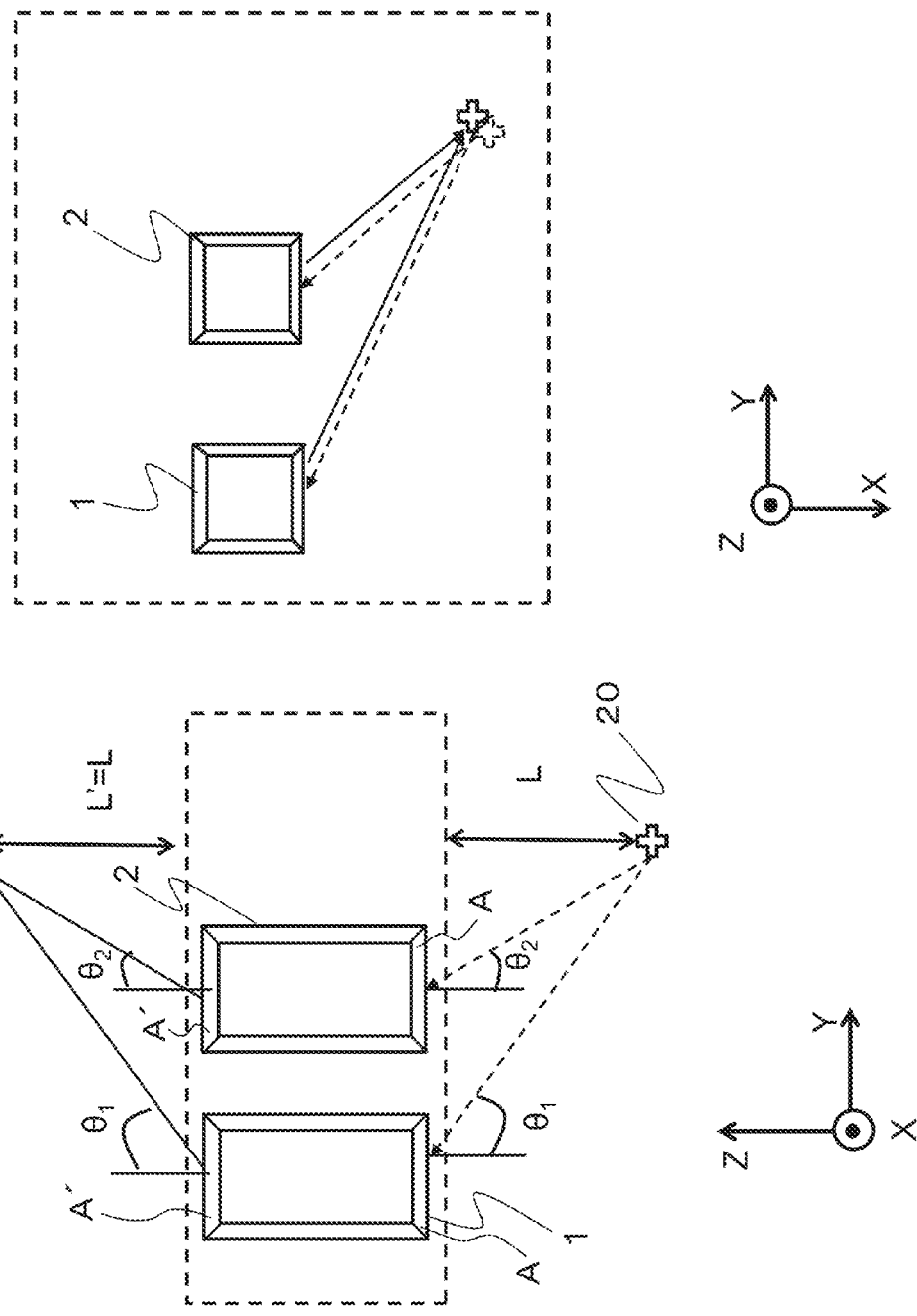

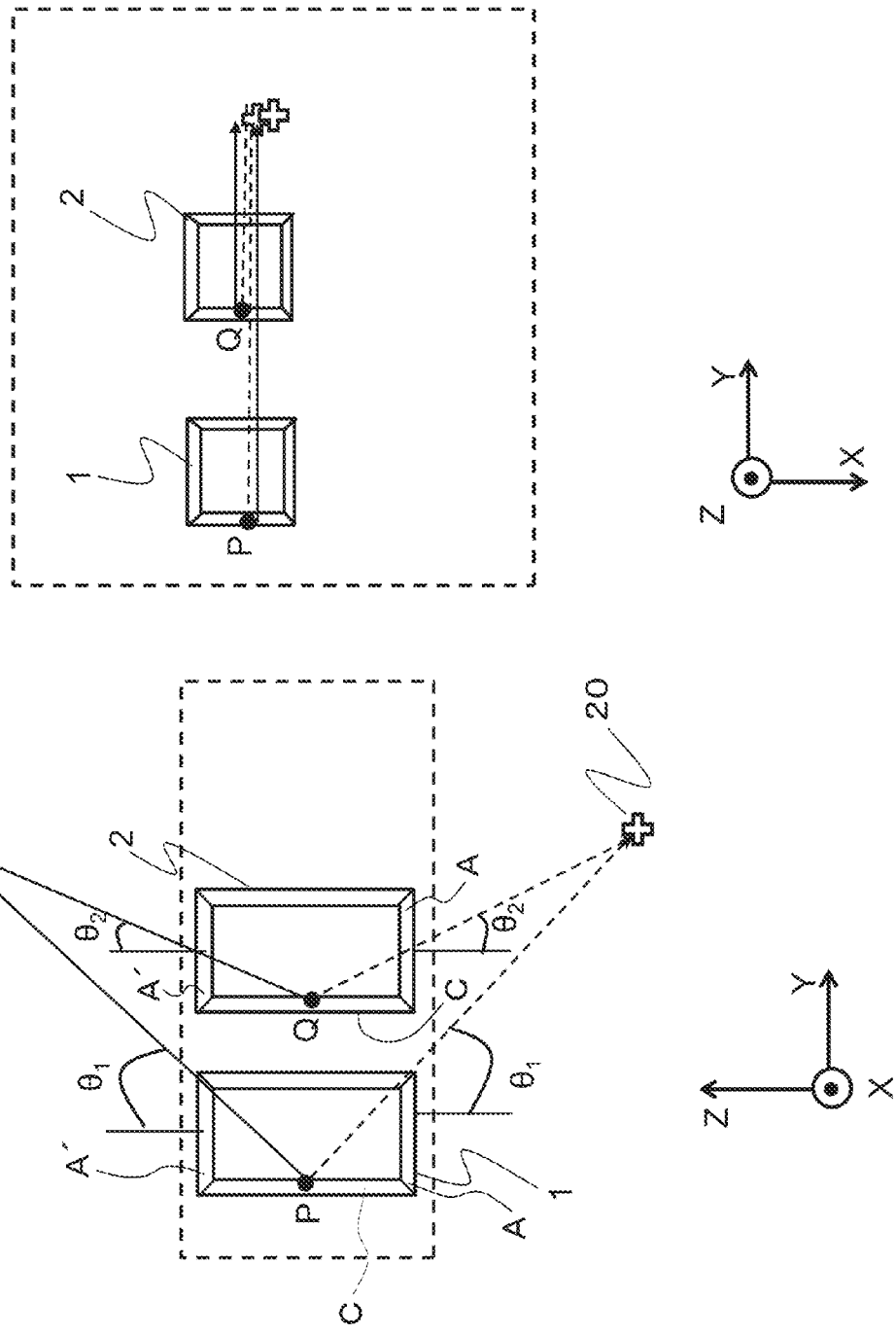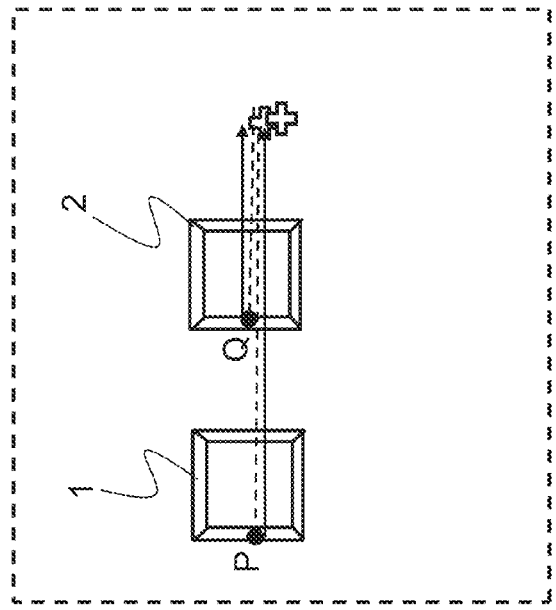

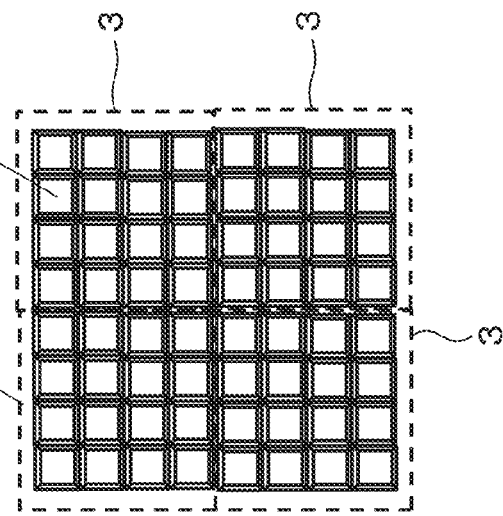
FIG. 5A
RELATED ART
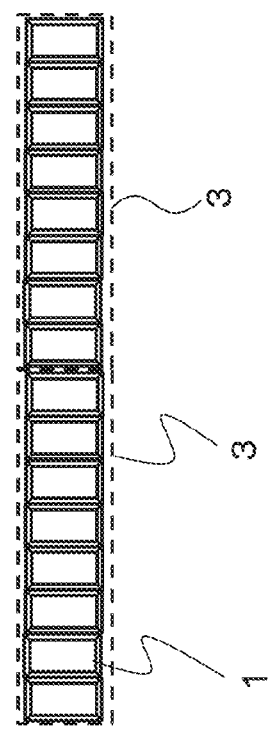
FIG. 5B
RELATED ART
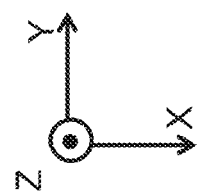
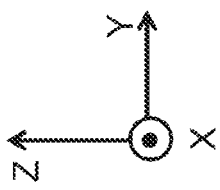

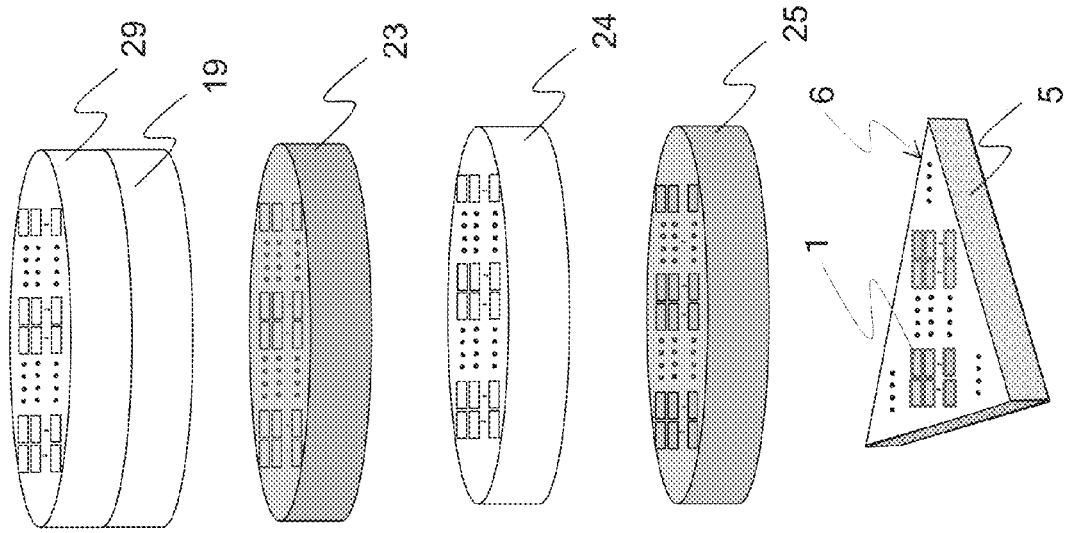
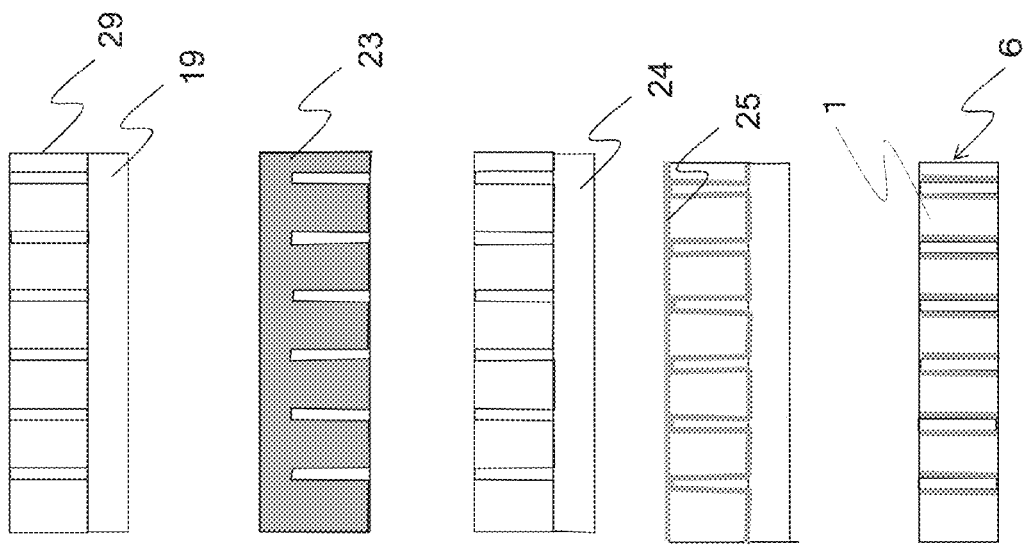
FIG. 12A  FIG. 12B  FIG. 12C  FIG. 12D  FIG. 12E

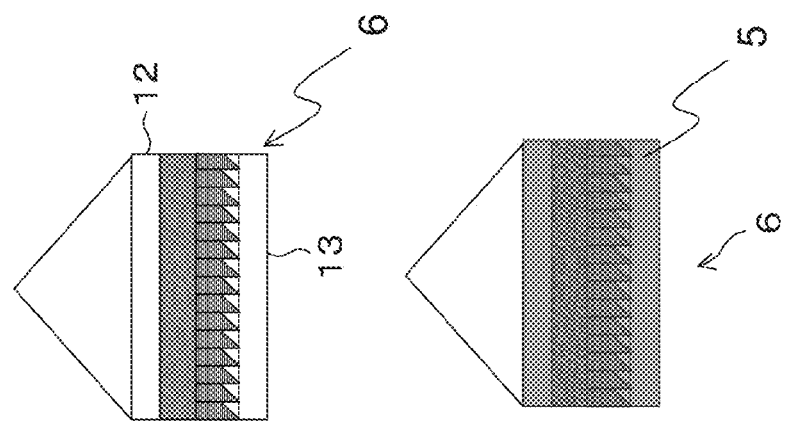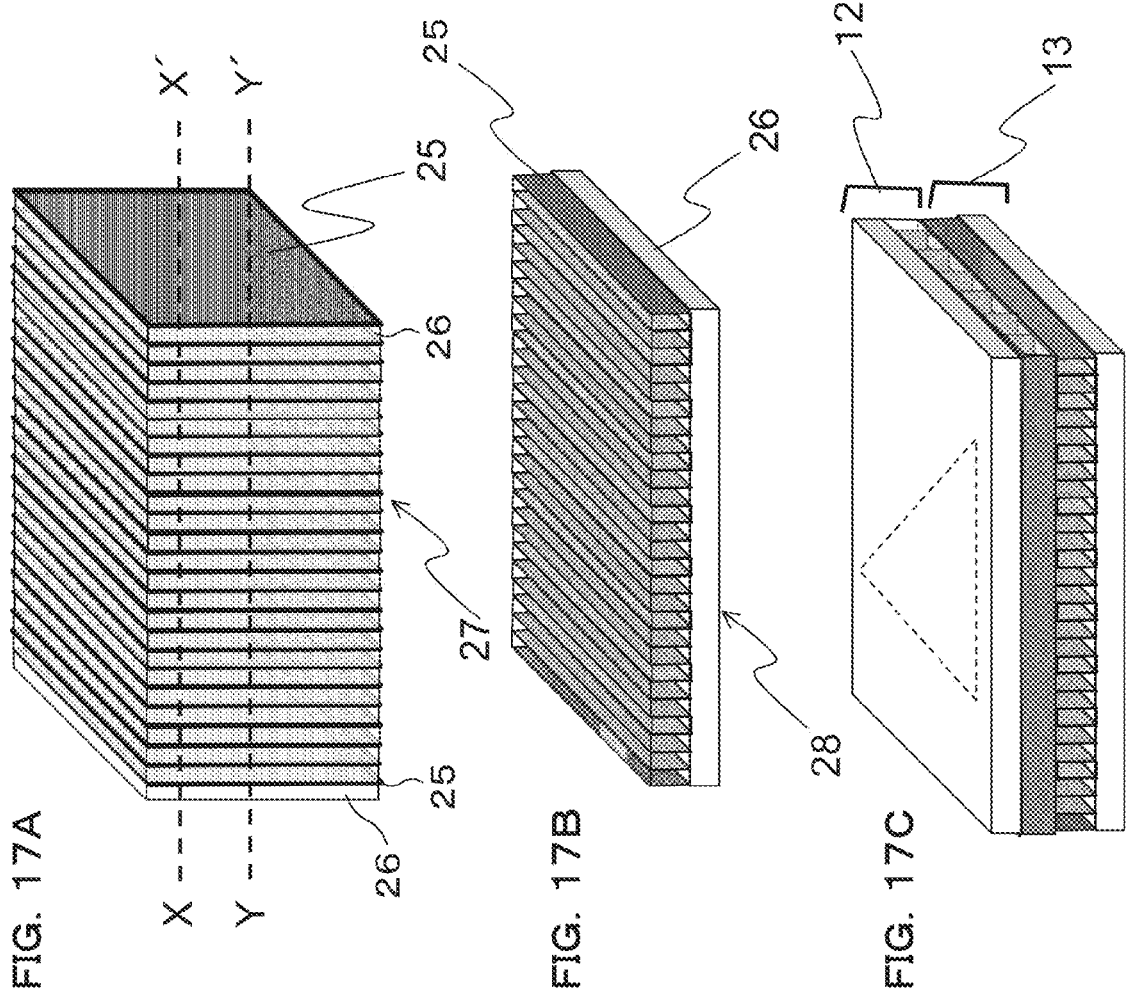

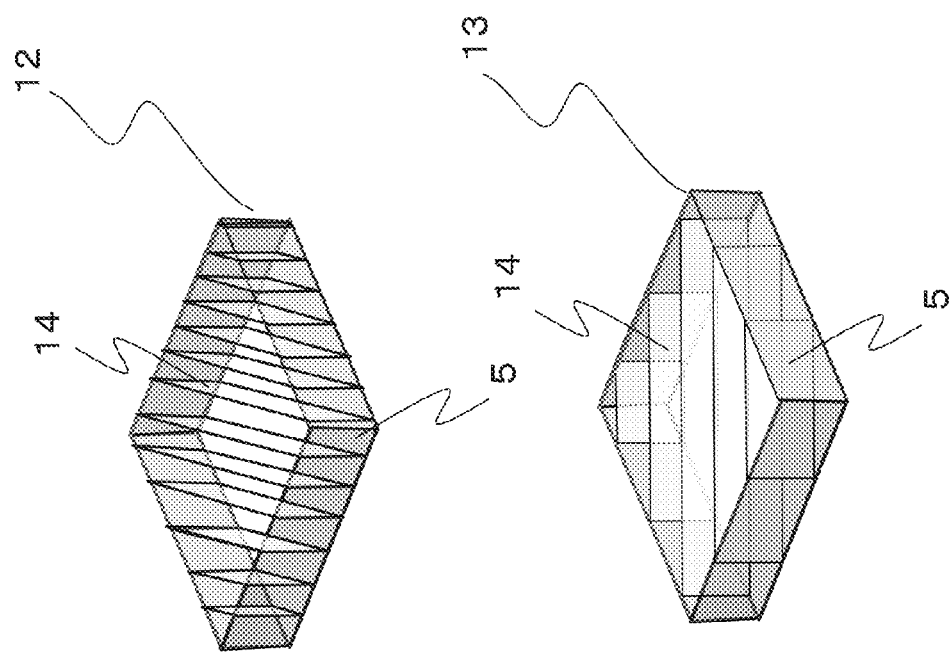
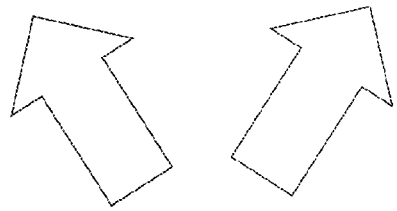
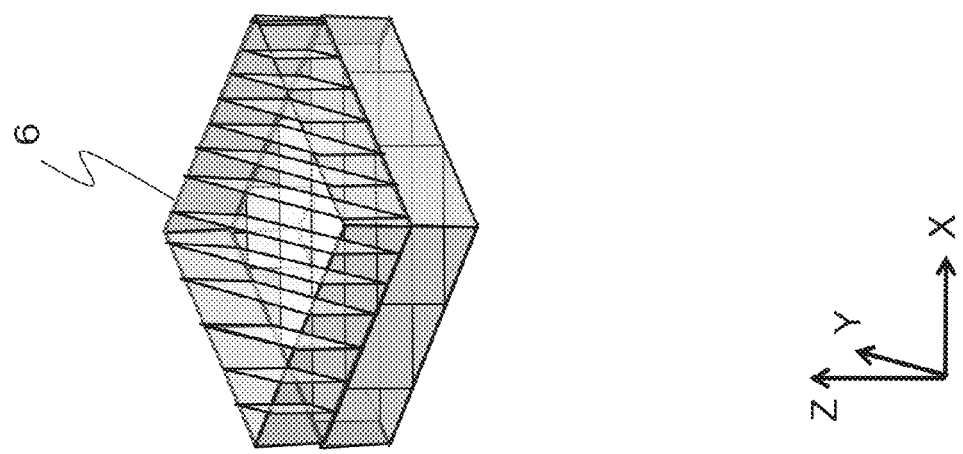
FIG. 19

OPTICAL ELEMENT AND DISPLAY APPARATUS

CROSS-REFERENCE TO RELATED APPLICATIONS

This Non-provisional application claims priority under 35 U.S.C. §119(a) on Patent Application No. 2015-117555 filed in Japan on Jun. 10, 2015, the entire contents of which are hereby incorporated by reference.

FIELD

The disclosure relates to an optical element, and more specifically, to a micromirror array element. The disclosure also relates to a display apparatus comprising an optical element.

BACKGROUND

In recent years, an optical element which forms a stereoscopic real image using a micromirror array element in which a large number of a pair of orthogonal micromirror elements are arranged has been developed.

Since early times, the eye of a lobster and the like has long been known as a lobster optical system corresponding to an imaging device in which a large number of quadrangular-prism-shaped reflective optical elements with mirror side surfaces are arranged on a spherical surface. The lobster optical system uses reflection, and thus has mainly been studied and developed in the area of a band of the wavelength for X rays, infrared rays or the like, which is difficult or expensive to obtain the material having a desired refractive index therefor.

It has been pointed out that a large number of the reflective optical elements described above are arranged on a flat plane instead of a spherical surface to form a stereoscopic real image. This will be described with reference to FIGS. 1A and 1B. FIGS. 1A and 1B are schematic views illustrating the structure of the conventional reflective optical element. FIG. 1A is a perspective view of a reflective optical element, whereas FIG. 1B is a plan view of the reflective optical element. In the description below, the spatial coordinate axes are referred to as XYZ axes. The X-axis, Y-axis and Z-axis are orthogonal to one another. As illustrated in FIGS. 1A and 1B, a large number of (three in FIGS. 1A and 1B) reflective optical elements 1 each having the shape of a quadrangular prism are arranged on an XY plane. The bottom surface of each reflective optical element 1 has the shape of a square, and each reflective optical element 1 is disposed on the XY plane such that the sides of the bottom surface thereof are aligned with the X-axis and Y-axis directions, respectively. Meanwhile, the height direction (axial direction) of each reflective optical element 1 is aligned with the Z-axis direction. An upper surface A' and a lower surface (bottom surface) A of each reflective optical element 1 are transparent, so that light can enter therethrough and be output therefrom. On the other hand, side surfaces B, B', C and C' of each reflective optical element 1 are so formed that at least two adjacent ones of the side surfaces are mirror surfaces which can reflect light.

Next, for the reflective optical element 1 illustrated in FIGS. 1A and 1B, transmission of an incident light ray inside the reflective optical element 1 in the case where the light ray enters through the bottom surface will be described with reference to FIGS. 2A and 2B. FIGS. 2A and 2B are schematic views illustrating reflection of light ray in the conventional reflective optical element 1. FIG. 2A illustrates the state of a light ray when the reflective optical element 1 is seen from the X-axis direction, whereas FIG. 2B illustrates the state of a light ray when the reflective optical element 1 is seen from the Z-axis direction. In the examples illustrated in FIGS. 2A and 2B, the incident light ray enters from a point a on the lower surface A, and thereafter travels straight to reach a point b on the side surface C' at which it is reflected. The light ray reflected at the side surface C' is further reflected again at a point c on the side surface B, and is output from a point d on the upper surface A'. As can be seen from FIG. 2A, the light ray entering the reflective optical element 1 at an incident angle θ1 is output at an output angle θ1. Furthermore, as illustrated in FIG. 2B, the projection of the incident light ray onto the lower surface A (XY plane) has the same size as the projection of the output light ray onto the upper surface A' (XY plane). That is, in FIG. 2B, the projection of the incident light ray onto the lower surface A is in an antiparallel state with the projection of the output light ray onto the upper surface A'.

In view of the description above, the mechanism of image forming in the case where a large number of reflective optical elements 1 are arranged will be described with reference to FIGS. 3A and 3B. FIGS. 3A and 3B are schematic views illustrating double reflection and image forming in the conventional reflective optical element 1. FIG. 3A illustrates the reflective optical elements 1 and 2 when seen from the X-axis direction, whereas FIG. 3B illustrates the reflective optical elements 1 and 2 when seen from the Z-axis direction. In the example illustrated in FIGS. 3A and 3B, the light ray from a point light source 20 enters the lower surface A of each of the reflective optical elements 1 and 2. The light ray from the point light source 20 enters the lower surface A of the reflective optical element 1 at the incident angle θ1. As has already been described, the incident light ray is output from the upper surface A' of the reflective optical element 1 at the output angle θ1. Here, as illustrated in FIG. 3B, the output light ray at the upper surface A' (XY plane) travels inversely to the direction of the incident light ray at the lower surface A (XY plane). Moreover, the light ray from the point light source 20 enters the lower surface A of the reflective optical element 2 at an incident angle θ2, and the light ray is output from the upper surface A' of the reflective optical element 2 also at the output angle θ2. Accordingly, the output light rays from the two reflective optical elements 1 and 2 intersect with each other again.

As described above, it can be seen that the light rays from the point light source 20 are condensed again after passing through the reflective optical elements 1 and 2 to form a double reflection image 21. As illustrated in FIG. 3A, assuming that the distance between the point light source 20 and the arrangement surfaces (lower surfaces A) of the reflective optical elements 1 and 2 is L, it can be seen that the distance L is equal to a distance L' between the image (here, the double reflection image 21) and the arrangement surfaces (upper surfaces A') of the reflective optical elements 1 and 2, and that the position of the image is symmetrical to the point light source 20 with respect to the arrangement surfaces of the reflective optical elements 1 and 2 (specifically, the surface passing through the middle between the lower surfaces A and the upper surfaces A').

As described above, the image is formed by the light rays (twice-reflected light rays) that are reflected twice in the respective reflective optical elements 1 and 2. However, it has also been known that a single reflection image is formed by the light rays (once-reflected light rays) that are reflected once in the reflective optical elements 1 and 2. This will be described with reference to FIGS. 4A and 4B. FIGS. 4A and 4B are schematic views illustrating single reflection and image forming in the conventional reflective optical elements 1 and 2. FIG. 4A illustrates the reflective optical elements 1 and 2 when seen from the X-axis direction, whereas FIG. 4B illustrates the reflective optical elements 1 and 2 when seen from the Z-axis direction. In the example illustrated in FIGS. 4A and 4B, the light rays from the point light source 20 enter the lower surfaces A of the reflective optical elements 1 and 2, respectively, are reflected once at points P and Q on the respective side surfaces C of the reflective optical elements 1 and 2, are thereafter output from the upper surfaces A' of the reflective optical elements 1 and 2, and are condensed again to form an image (single reflection image 22). As can be seen from the description above, the single reflection image 22 is more prominent when observed from the direction parallel to the sides on the lower surfaces A of the reflective light source elements 1 and 2 (Y-axis direction in FIGS. 4A and 4B).

On the other hand, the double reflection image 21 is more intense in the diagonal line direction of the lower surfaces A of the reflective optical elements 1 and 2, as can be understood from the illustration of FIGS. 2A to 3B. Accordingly, the double reflection image 21 and the single reflection image 22 have different observing directions on the XY plane, which allow only the double reflection image 21 to be seen by setting the observing orientation to the diagonal line direction of the bottom surfaces A of the reflective optical elements 1 and 2.

The resolution of the double reflection image 21 is determined by the size of the reflective optical elements 1 and 2. It is therefore desirable in practice to employ the reflective optical elements 1 and 2 each having one side of the bottom surface A being 0.5 mm or shorter. In addition, it is understood that the image is brighter if the thickness (height in the Z-axis direction) of the reflective optical elements 1 and 2 is larger. Thus, for the reflective optical elements 1 and 2, a shape with a high aspect ratio, i.e. a small bottom surface A and a large thickness (height), is desired. On the other hand, in order to obtain a large stereoscopic image, it is necessary to produce an array of reflective optical elements having a large area (size) in which a large number of reflective optical elements 1 and 2 are arranged.

It is however difficult in terms of a production method to prepare at a time the array of reflective optical elements with a large area including a large number of reflective optical elements 1 and 2 each having a high aspect ratio and a microscopic shape. Thus, such a method has been considered as to prepare a plurality of small pieces each having a relatively small area and connect the small pieces with one another on a plane to form an array of reflective optical elements having a large area (see International Publication No. WO2013/061619, for example). This is called tiling, and each of the small pieces is called a tile.

FIGS. 5A to 6 are schematic views illustrating the tiling structures of the conventional reflective optical elements. FIG. 5A illustrates the tiles when seen from the X-axis direction, whereas FIGS. 5B and 6 illustrate the tiles when seen from the Z-axis direction. International Publication No. WO2013/061619 has proposed to prepare square tiles 3 each having multiple reflective optical elements 1 arranged on the XY plane and arrange the multiple tiles 3 on the XY plane, as illustrated in FIGS. 5A and 5B, to obtain an array of reflective optical elements having a larger area. International Publication No. WO2013/061619 has also proposed, as illustrated in FIG. 6, to prepare fan-shaped tiles 4 in which multiple reflective optical elements 1 are arranged in a fan-like shape, and combine the multiple fan-shaped tiles 4 together to obtain a substantially circular array of reflective optical elements. Here, the ends of the tiles 3 and 4 have broken side surfaces that are reflective plates, which generate reflected light causing undesirable noise if they remain broken, and the light is irregularly reflected in directions different from the intended reflecting direction. To prevent this, International Publication No. WO2013/061619 describes that a light shielding part 5 is provided by applying a light shielding process to the ends of the tiles 3 and 4 to suppress unnecessary reflection.

SUMMARY

The array of reflective optical elements constituted by the tiling as described above, however, develops a problem of luminance variation in a reflection image. This will be described with reference to FIGS. 7A to 8B. FIGS. 7A to 8B are schematic views illustrating the problem in the conventional tiling structure. FIGS. 7A and 8A are perspective views of the arrays of reflective optical elements, whereas FIGS. 7B and 8B are plan views of the arrays of reflective optical elements when seen from the Z-axis direction. A reflective optical element array 11a illustrated in FIGS. 7A and 7B is formed by connecting square tiles 3 illustrated in FIGS. 5A and 5B, whereas a reflective optical element array 11b illustrated in FIGS. 8A and 8B is formed by connecting fan-shaped tiles 4 illustrated in FIG. 6. In the case where a stereoscopic image with a large area (large size) is formed, the original object may be regarded as a collection of point light sources 20. Here, it is necessary to take into account the point light source 20 located directly below the boundary between the tiles 3 (or the tiles 4).

FIG. 7B illustrates a situation where the point light source 20 is located directly below the boundary between the tiles 3. In the example illustrated in FIGS. 7A and 7B, the light ray from the point light source 20 passes through the reflective optical element array 11a, and is then condensed again to form an image 21. For example, the light rays a, b and c from the point light source 20 enter the lower surface of the reflective optical element array 11a, are reflected at points Pa, Pb and Pc inside the reflective optical element array 11a, thereafter are output from the upper surface of the reflective optical element array 11a, and are condensed to form the image 21. Moreover, after forming the image 21, the light rays a, b and c are diffused again as illustrated in FIG. 7B with respect to the XY plane orientation. In such reflective optical element array 11a, an observer can view the light rays a, b and c when moving around the Z-axis along the points A, B and C in FIG. 7B.

In the example illustrated in FIGS. 7A and 7B, since the point light source 20 is located directly below the boundary between the tiles 3, it can be found that the light ray b is a reflected light ray from this boundary. As the boundary between the tiles 3 is a junction between the tile 3 and the tile 3, the reflectivity here is lower than the normal reflectivity of the tile 3 (reflective optical element 1) itself. That is, the reflective optical element 1 is cut at the boundary between the tiles 3, so that the light ray is scattered in a direction other than the intended direction due to the cut surface. In addition, the reflectivity is lowered because the light shielding process is applied to the ends (end surfaces) of the tiles 3. Thus, the brightness of the light ray b is lower than the light rays a and c. This causes luminance variation in the image 21 when the observer views the point light source 20 while moving around the Z-axis.

As illustrated in FIGS. 8A and 8B, also in the reflective optical element array 11b constituted by the fan-shaped tiles 4, the light rays a, b and c from the point light source 20 enter the lower surface of the reflective optical element array 11b, are reflected at the points Pa, Pb and Pc, are then output from the upper surface thereof and are condensed to form the image 21. Also in such reflective optical element array 11b, the point Pb at which the light ray b from the point light source 20 is reflected is located at the boundary between the fan-shaped tiles 4, which lowers the luminance of the light ray b. Therefore, as in the reflective optical element array 11a illustrated in FIGS. 7A and 7B, luminance variation in the image 21 also occurs in the reflective optical element array 11b illustrated in FIGS. 8A and 8B when the observer views the point light source 20 while moving around the Z-axis.

An optical element according to an aspect of the invention includes a plurality of tiles each constituted by a plurality of reflective optical elements and has a plane surface. The tiles are formed such that outer shapes on the plane surface of the tiles have at least two different triangular shapes, and each of the tiles is provided with a light shielding part at an end surface thereof.

The above and further objects and features of the invention will more fully be apparent from the following detailed description with accompanying drawings.

It is to be understood that both the foregoing general description and the following detailed description are exemplary and explanatory and are not restrictive of the invention.

BRIEF DESCRIPTION OF THE DRAWINGS

FIGS. 1A and 1B are schematic views illustrating the structure of the conventional reflective optical element;

FIGS. 3A and 3B are schematic views illustrating double reflection and image forming in the conventional reflective optical element;

FIGS. 4A and 4B are schematic views illustrating single reflection and image forming in the conventional reflective optical element;

FIGS. 5A and 5B are schematic views illustrating a tiling structure of the conventional reflective optical element;

FIGS. 12A to 12E are schematic views illustrating a procedure of producing the optical element according to Embodiment 1;

FIGS. 17A to 17E are schematic views illustrating a procedure of producing the optical element according to Embodiment 3;

FIG. 19 is a perspective view of a tile according to Embodiment 4; and

DETAILED DESCRIPTION

Embodiments of the invention will be described in detail below with reference to the drawings.

Embodiment 1

Figure 2A:
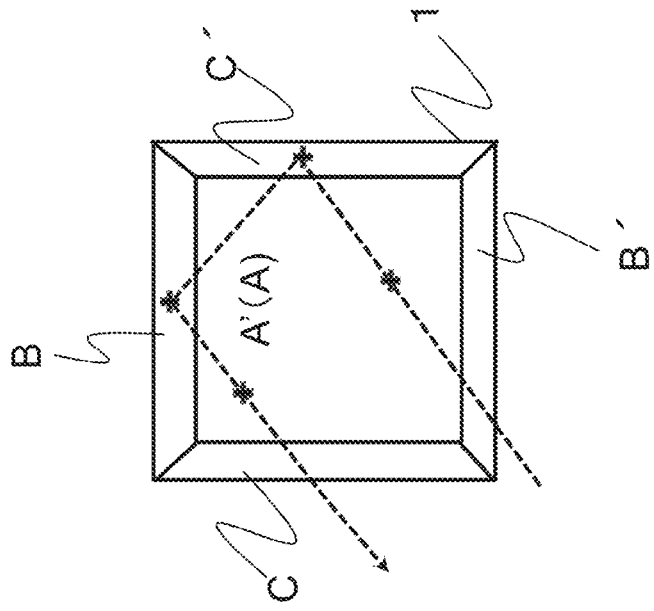
FIGS. 2A and 2B are schematic views illustrating reflection of light ray in the conventional reflective optical element.
Figure 2B:
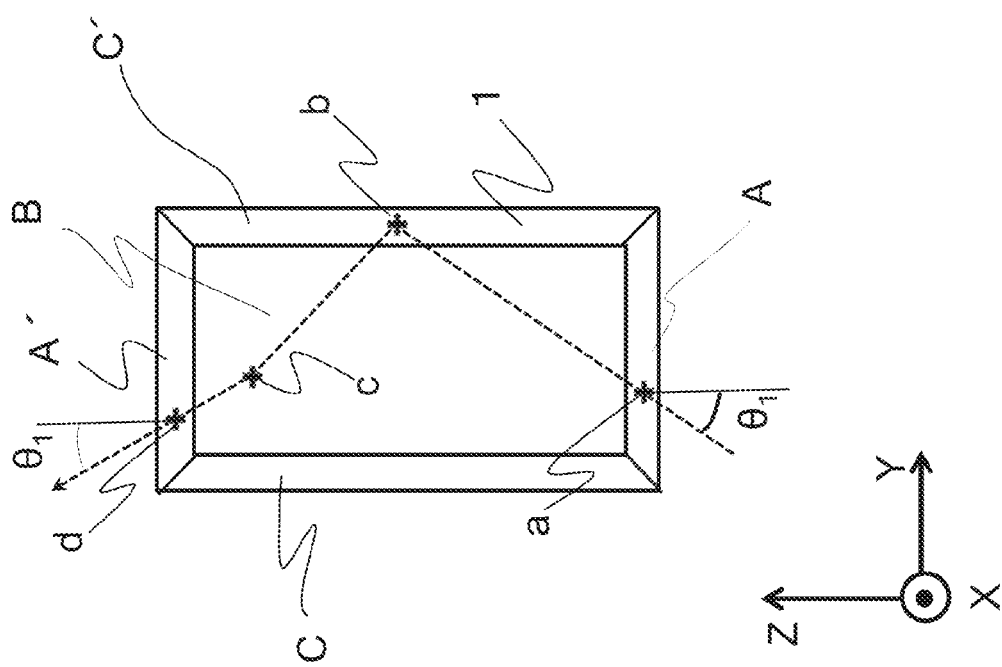
Figure 6:
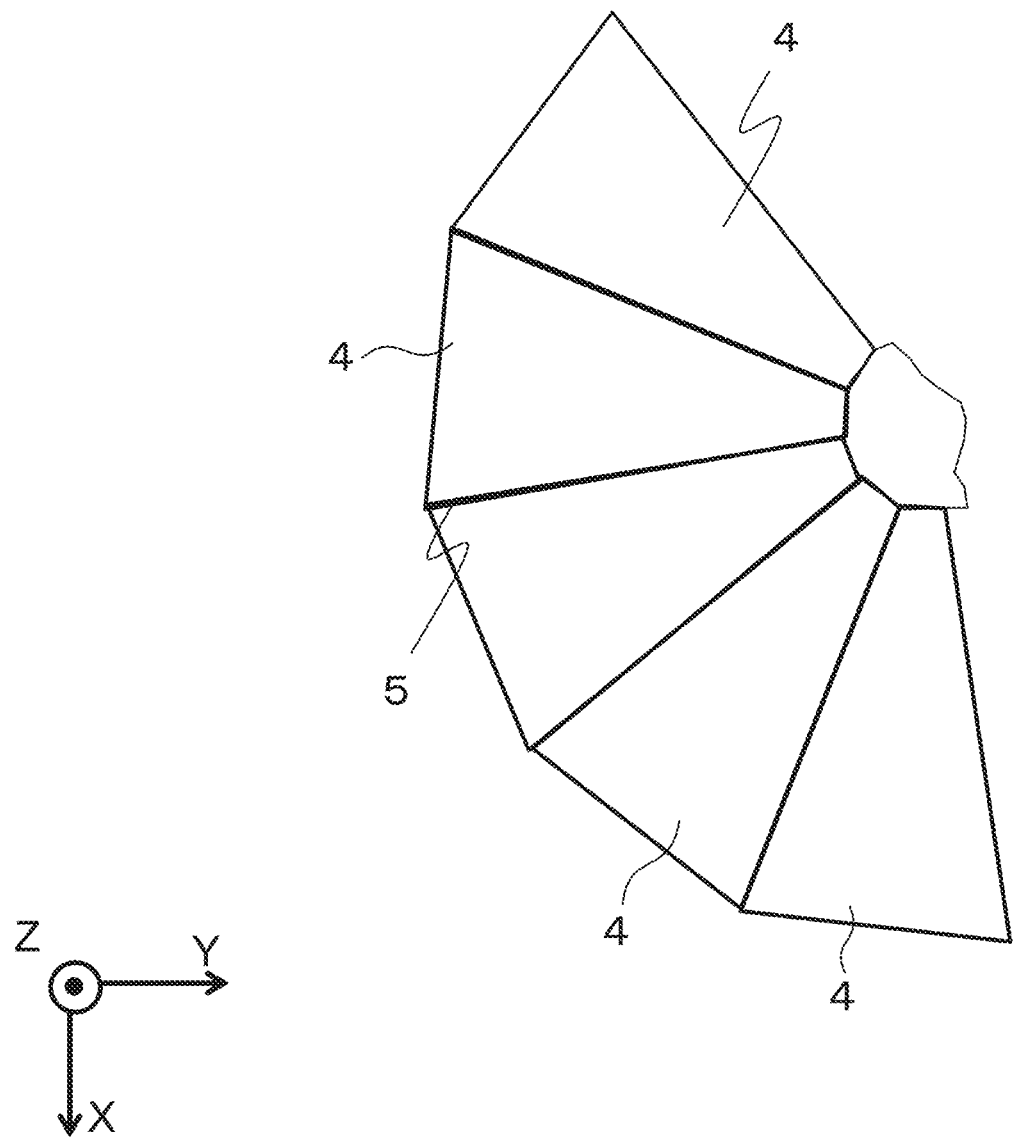
FIG. 6 is a schematic view illustrating a tiling structure of the conventional reflective optical element.
Figure 7A:
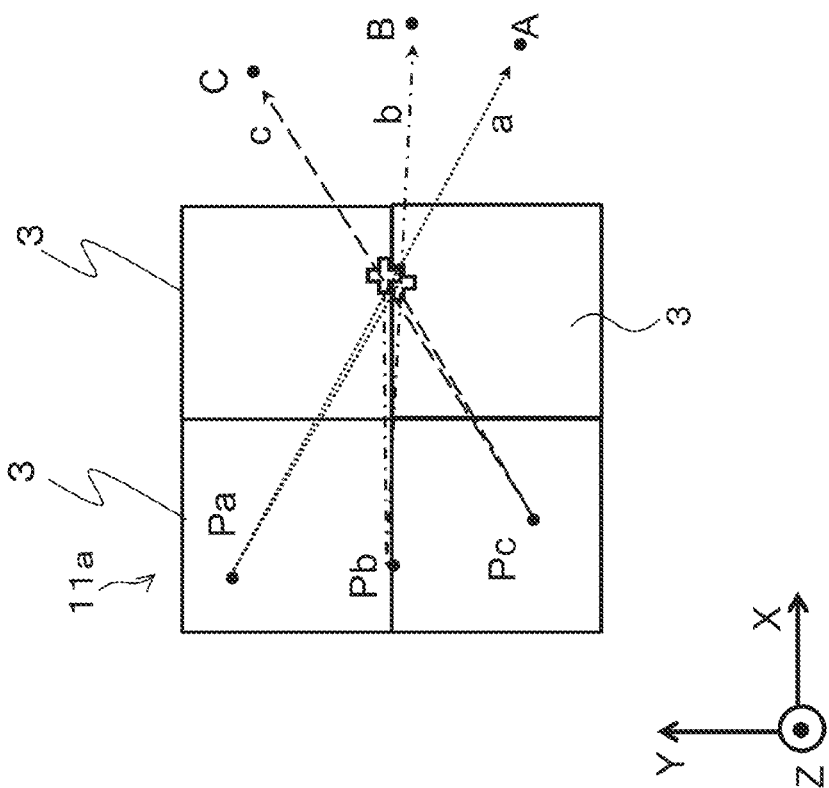
FIGS. 7A and 7B are schematic views illustrating a problem in the conventional tiling structure.
Figure 7B:
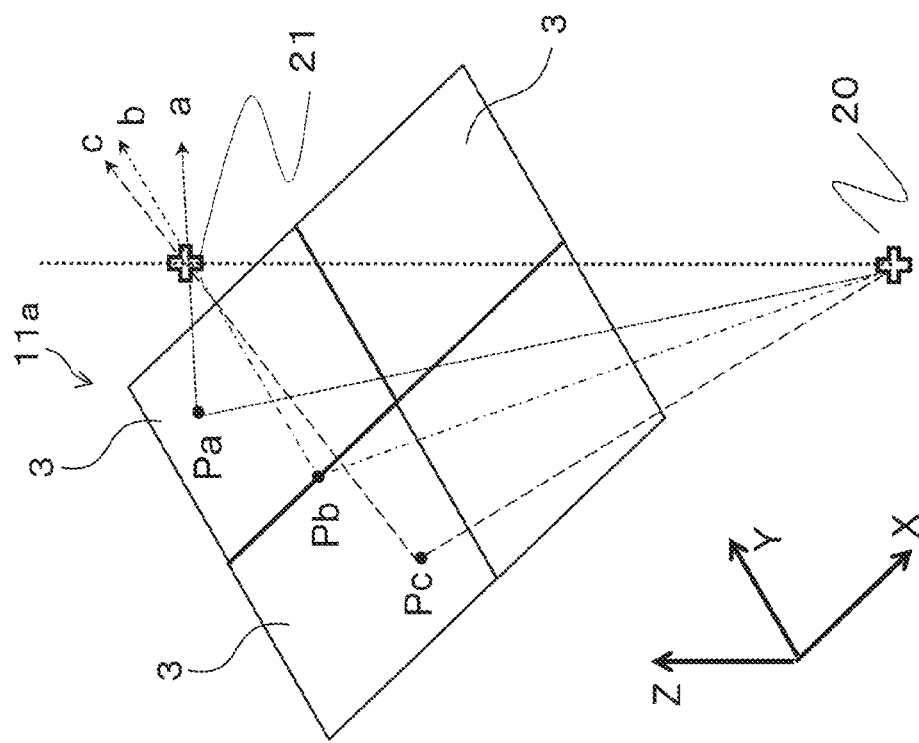
Figure 8A:
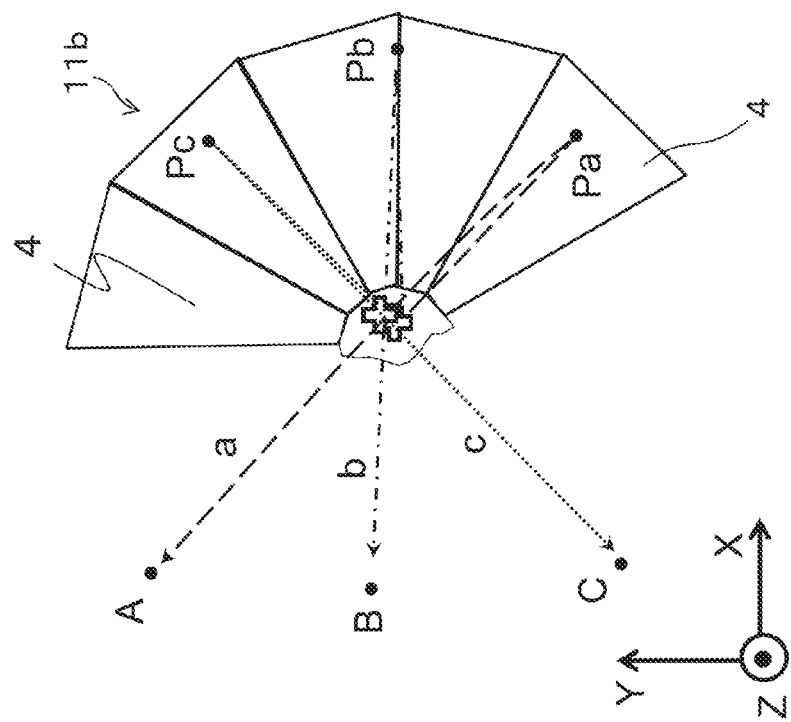
FIGS. 8A and 8B are schematic views illustrating a problem in the conventional tiling structure.
Figure 8B:
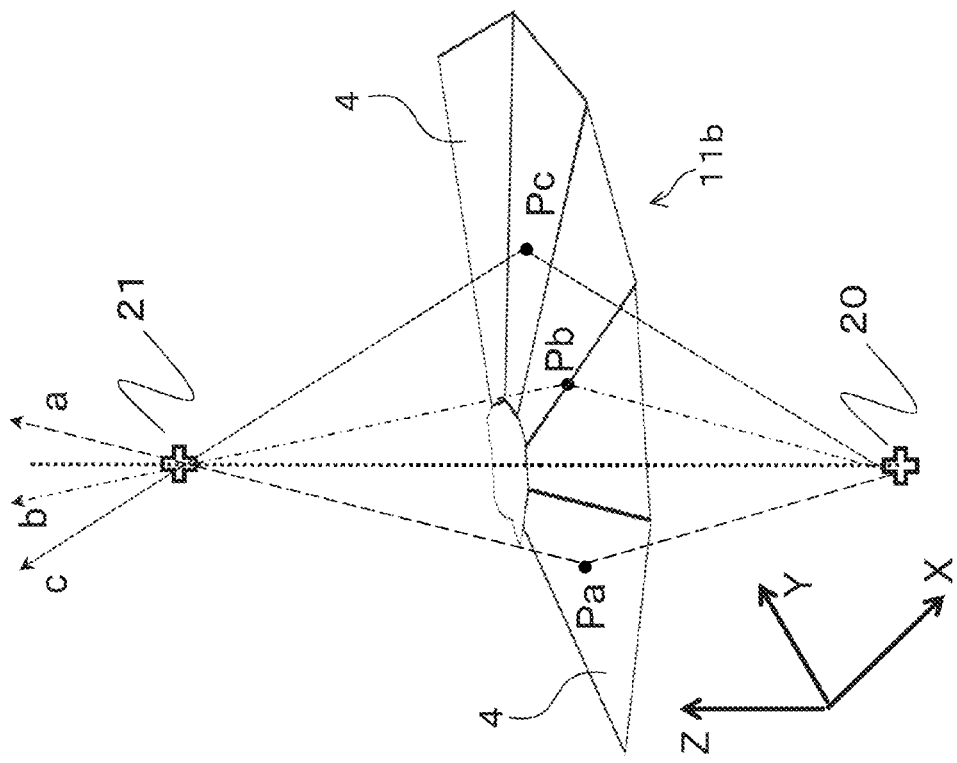
Figure 9:
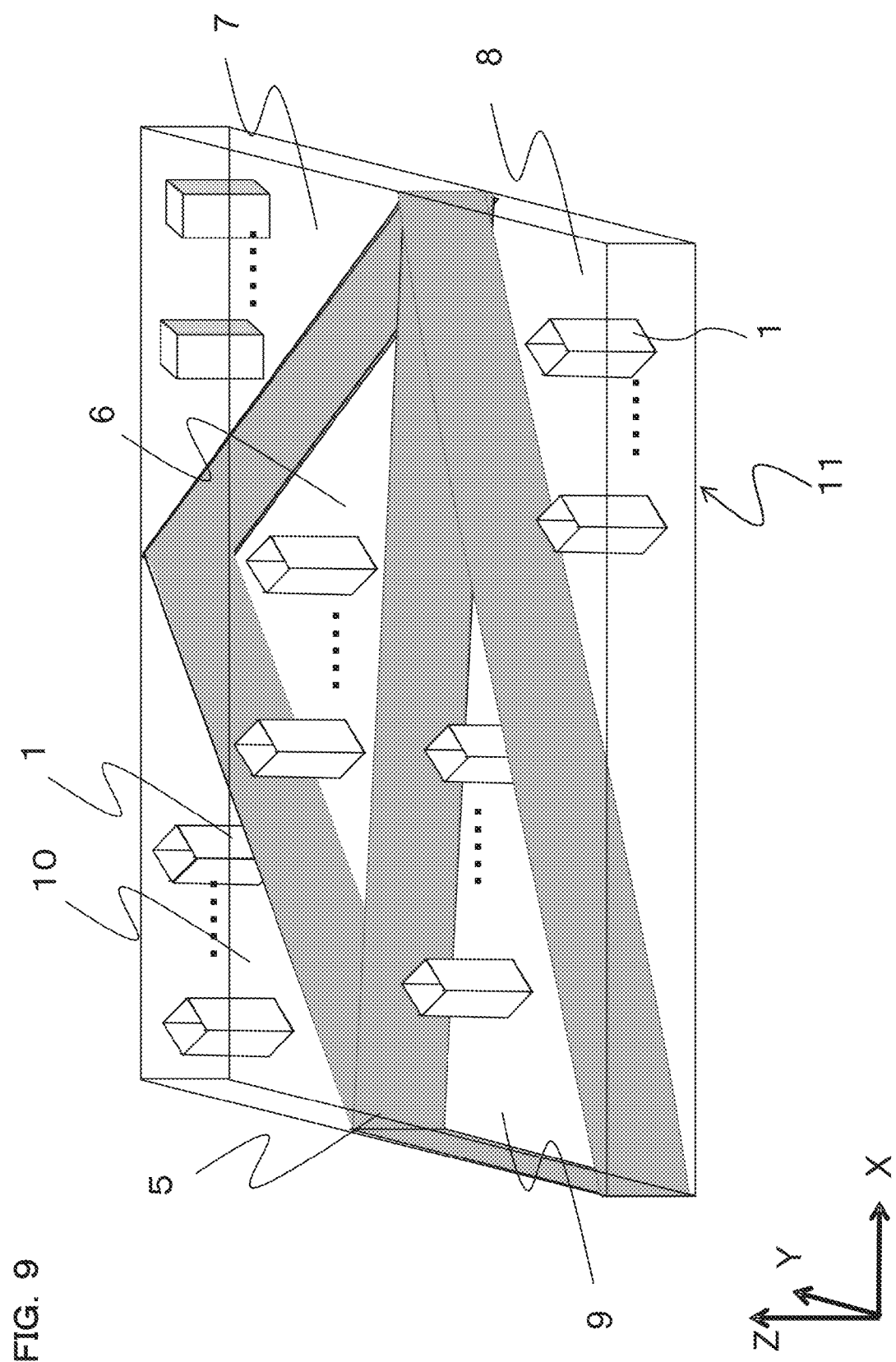
FIG. 9 is a perspective view of an optical element according to Embodiment 1.
Figure 10:
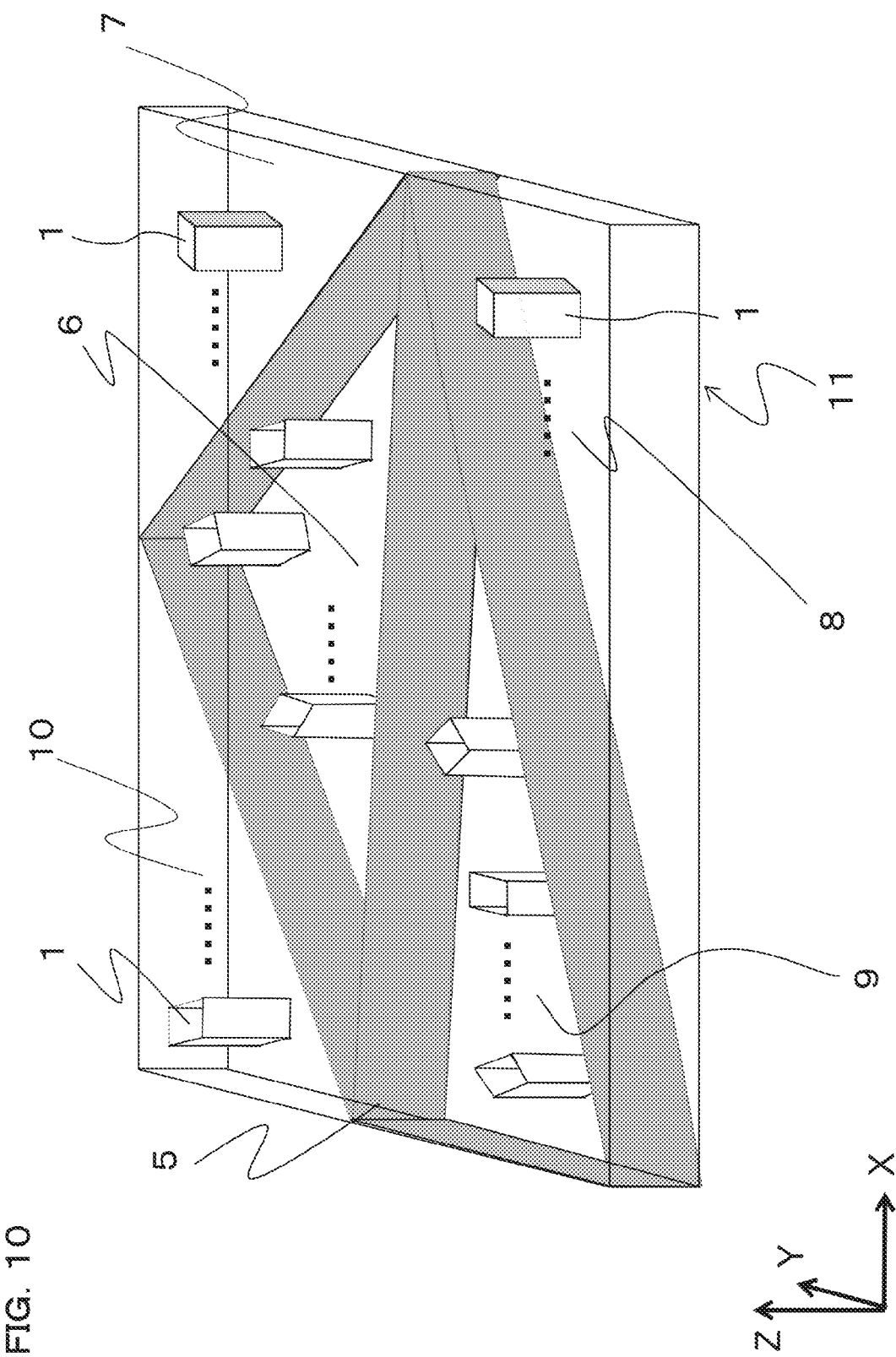
FIG. 10 is a perspective view of the optical element according to Embodiment 1.

The configuration according to Embodiment 1 of the invention will be described. FIGS. 9 and 10 are perspective views of an optical element according to Embodiment 1. As illustrated in FIGS. 9 and 10, a reflective optical element array 11 according to Embodiment 1 is formed in the shape of a rectangular flat plate. In the description below, spatial coordinate axes are referred to as XYZ axes, the direction along the plane surface of the reflective optical element array 11 is referred to as an XY-plane direction, and the thickness direction of the reflective optical element array 11 is referred to as a Z-axis direction.

The reflective optical element array (optical element) 11 according to Embodiment 1 is constituted by arranging multiple tiles 6, 7, 8, 9 and 10 on the XY plane. Each of the tiles 6 to 10 is formed in the shape of a flat plate having the same thickness. Moreover, the outer shape of each of the tiles 6 to 10 is formed in a triangular shape on the XY plane, while the tiles 6 to 10 are formed in the shapes of at least two different types of triangles. Furthermore, light shielding parts 5 are formed on the respective end surfaces (side surfaces) of the tiles 6 to 10 by applying a light shielding process to the end surfaces, the light shielding parts 5 dividing adjacent ones of the tiles 6 to 10. In addition, each of the tiles 6 to 10 is constituted by multiple reflective optical elements 1. Each of the reflective optical elements 1 has a quadrangular prism shape with the bottom surface (lower surface) being a square, and is arranged with its bottom surface located on the XY plane and its axis (height direction) corresponding to the Z-axis direction. Moreover, at least two adjacent side surfaces of the four side surfaces of the reflective optical element 1 serve as reflection surfaces. The side surfaces of the reflective optical element 1 may be oriented in any directions on the XY plane. For example, as illustrated in FIG. 9, all the reflective optical elements 1 may be oriented in the same direction within the same one of the tiles 6 to 10. On the other hand, as illustrated in FIG. 10, the reflective optical elements 1 may be oriented in different directions on the XY plane within the same one of the tiles 6 to 10. This is because a double reflection image is generated by the light rays reflected twice within one reflective optical element 1. The outer shape of the tiles 6 to 10 may be determined based on, for example, the Delaunay triangulation. A technique of randomly positioning multiple points on the XY plane and connecting these points to divide the XY plane into multiple triangles is known as the Delaunay triangulation. With this procedure, the XY plane may be divided into multiple triangular tiles 6 to 10.

Figure 11B:
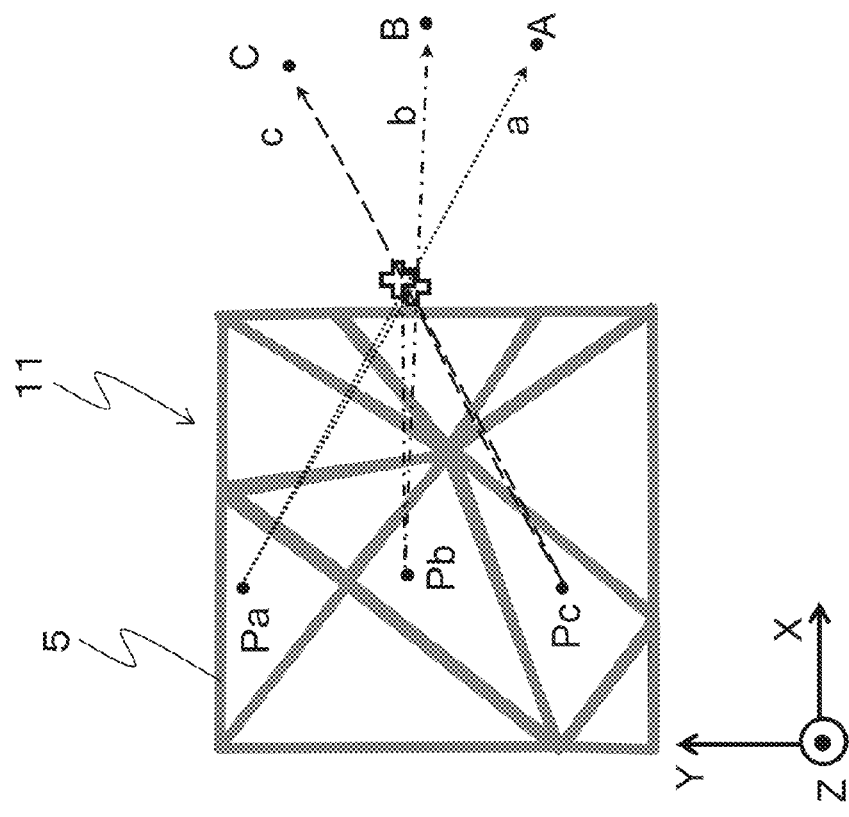
FIGS. 11A and 11B are schematic views illustrating the function of the optical element according to Embodiment 1.
Figure 11A:
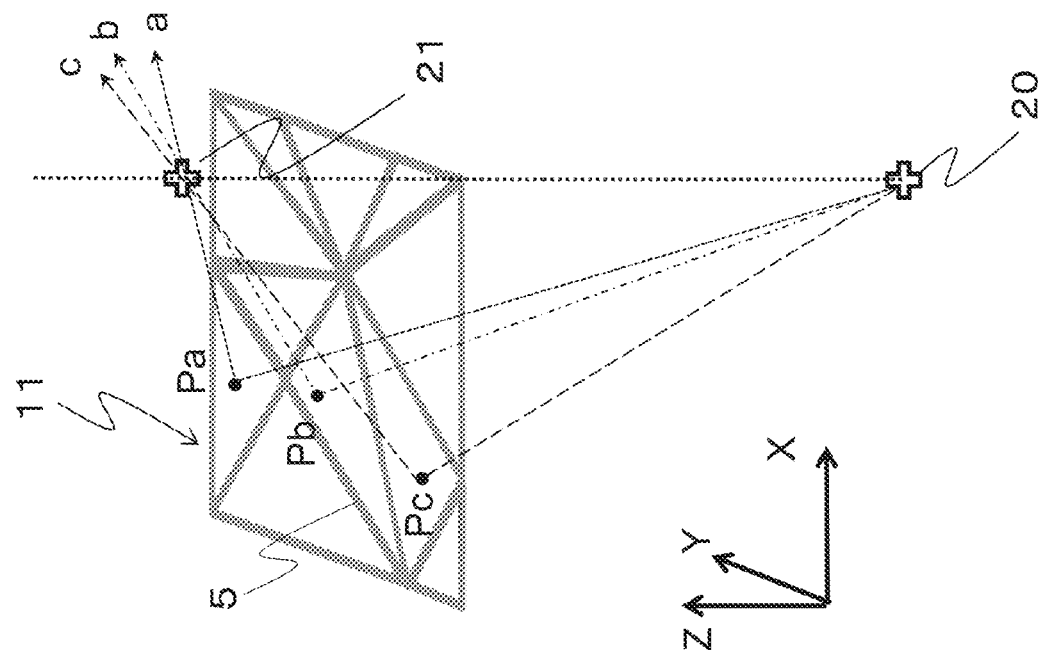

FIGS. 11A and 11B are schematic views illustrating the function of the optical element according to Embodiment 1. FIG. 11A is a perspective view of the reflective optical element array 11, whereas FIG. 11B is a plan view of the reflective optical element array 11 when seen from the Z-axis direction. The reflective optical element array 11 illustrated in FIGS. 11A and 11B is constituted by multiple tiles in which respective outer shapes thereof on the XY plane are the shapes of Delaunay triangles. As being divided into multiple tiles based on random points, the tiles have triangular shapes different from one another. Moreover, the light shielding part 5 to which the light shielding process is applied is present at the boundary between tiles. Since the tiles have irregular triangular shapes, the light shielding parts 5 are also irregularly arranged. Thus, the light rays a, b and c from the point light source 20 reflected at the points Pa, Pb and Pc of the reflective optical element array 11 are equally affected by the light shielding parts 5. Accordingly, the effects by the light shielding parts 5 are equalized, causing no luminance variation in the image 21 even if the observing point is moved around the Z-axis along the points A, B and C. Since the tiles included in the reflective optical element array 11 illustrated in FIGS. 11A and 11B all have different shapes, all types of tiles need to be prepared by designing the different shapes in advance.

Next, a method of producing the reflective optical element array 11 according to Embodiment 1 will be described. FIGS. 12A to 12E are schematic views illustrating the procedure of producing the optical element according to Embodiment 1. FIGS. 12A to 12E illustrate the states of the reflective optical element array 11 in each process performed in the production procedure, each illustrating the sectional structure thereof in each process on the left side and the appearance thereof in each process on the right side. In Embodiment 1, the reflective optical element array 11 is formed using the LIGA (Lithographie, Galvanoformung, Abformung) process. The LIGA process is a complex process in which lithography including X-ray exposure, electrocasting and molding are combined together, and is known as a process for producing a microscopic structure with a high aspect ratio.

First, a mask for X-ray exposure which uses a heavy metal pattern as a mask is prepared. And, an X-ray photoresist 29 applied to one surface of a substrate 19 is irradiated with X-ray through the mask for X-ray exposure, to form the pattern as illustrated in FIG. 12A. Polymethyl methacrylate (PMMA) is used for the X-ray photoresist 29, for example, and the thickness of the X-ray photoresist 29 is set to be approximately several hundred micrometers. The pattern is formed by being exposed to X-ray, and thus a resist pattern with a high aspect ratio can be formed.

Next, electrocasting is applied to the surface of the X-ray photoresist 29 in which the pattern illustrated in FIG. 12A is formed, to prepare an electrocasting metal mold 23 as illustrated in FIG. 12B. For the metal material of the electrocasting metal mold 23, nickel or the like is used.

Subsequently, a hot embossing process is applied to heat the surface of resin while pressurizing the electrocasting metal mold 23, to produce a molded resin 24 as illustrated in FIG. 12C. As the resin, for example, thermoplastic resin, epoxy resin or the like may be used.

Next, as illustrated in FIG. 12D, a highly-reflective metal layer 25 is formed on the surface of the molded resin 24. As the highly-reflective metal layer 25, aluminum, silver or the like may be used. For example, the highly-reflective metal layer 25 may be coated on the surface of the molded resin 24 by sputtering or vacuum vapor deposition.

Thereafter, the molded resin 24 coated with the highly-reflective metal layer 25 is divided into parts each having a shape of a Delaunay triangle which has been designed in advance by a cutting work, to produce tiles 6 to 10 having different triangular shapes. In the case of producing the reflective optical element array 11 illustrated in FIGS. 11A and 11B, eleven different triangular tiles need to be prepared. Furthermore, in each of the prepared tiles 6 to 10, a cutting work or a polishing work is applied to the rear surface of the molded resin 24 so that the highly-reflective metal layer 25 can be seen from the rear surface side. Accordingly, the tiles 6 to 10 in which multiple reflective optical elements 1 are arranged are completed, as illustrated in FIG. 12E. FIG. 12E only illustrates the tile 6.

Moreover, a black coating material is applied to each of the side surfaces of the tiles 6 to 10 for a light shielding process, to form a light shielding part 5. For example, the light shielding process may be performed by coating the tiles with a black coating material while masking the front and rear surfaces (upper and lower surfaces) of the tiles.

The tiles 6 to 10 prepared as described above are combined in accordance with the layout as illustrated in FIGS. 11A and 11B, to complete the reflective optical element array 11. Accordingly, in the optical element constituted by tiling, the reflective optical element array 11 having a large area (size) and a small variation in the luminance of the image occurring when an observing point is moved, can be obtained.

Embodiment 2

Figure 13:
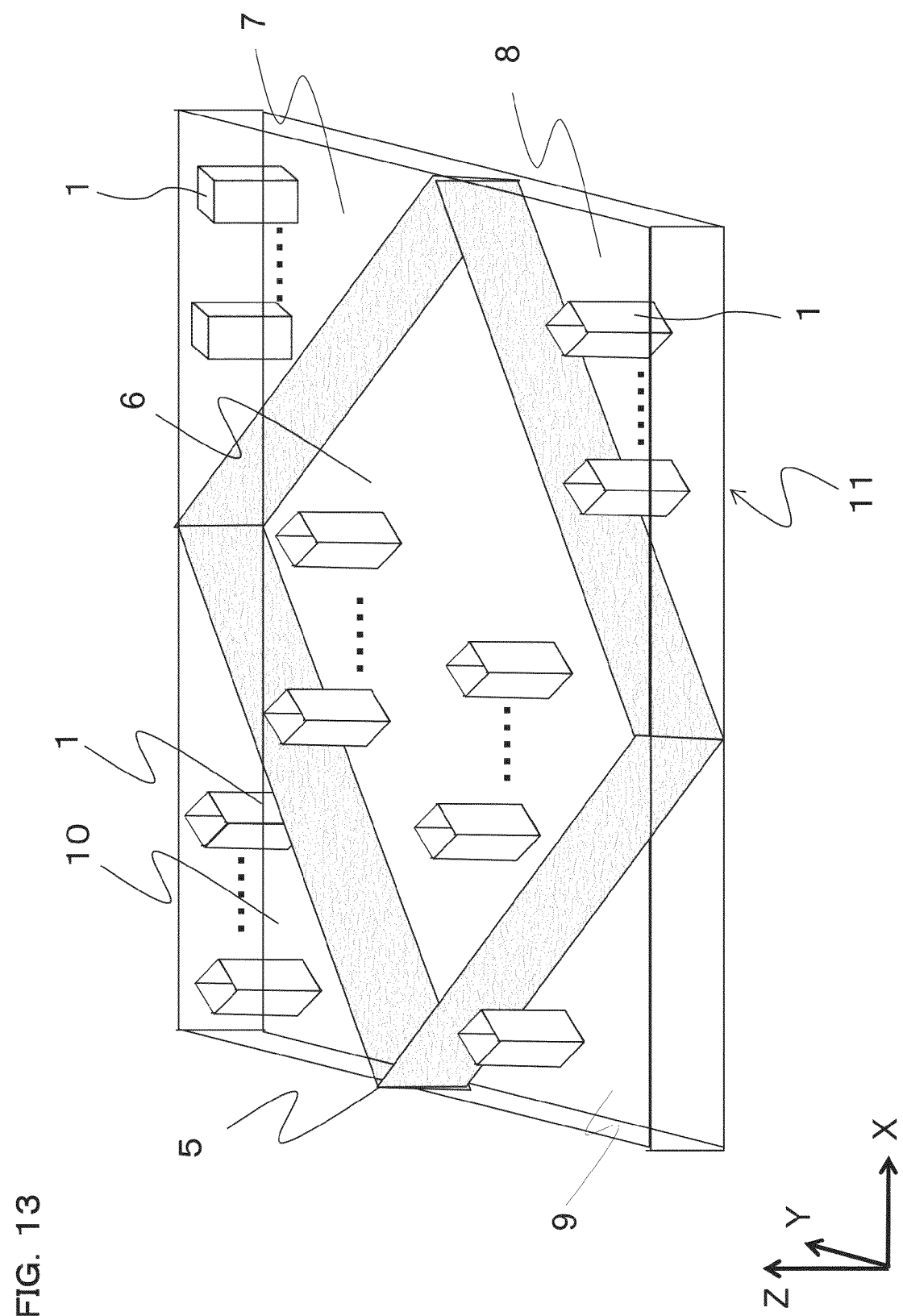
FIG. 13 is a perspective view of an optical element according to Embodiment 2.
Figure 14:
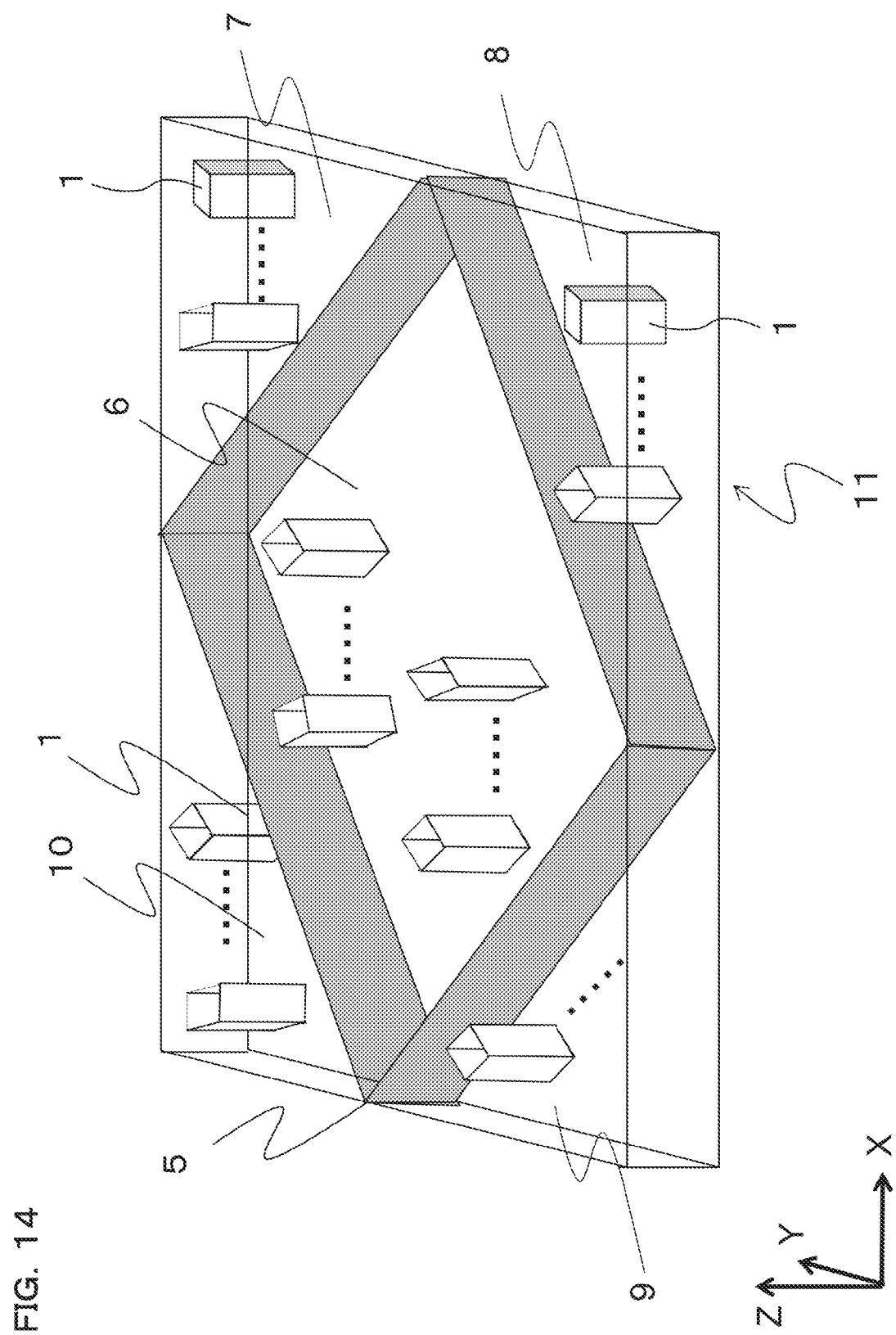
FIG. 14 is a perspective view of the optical element according to Embodiment 2.
Figures 15A, 15B:
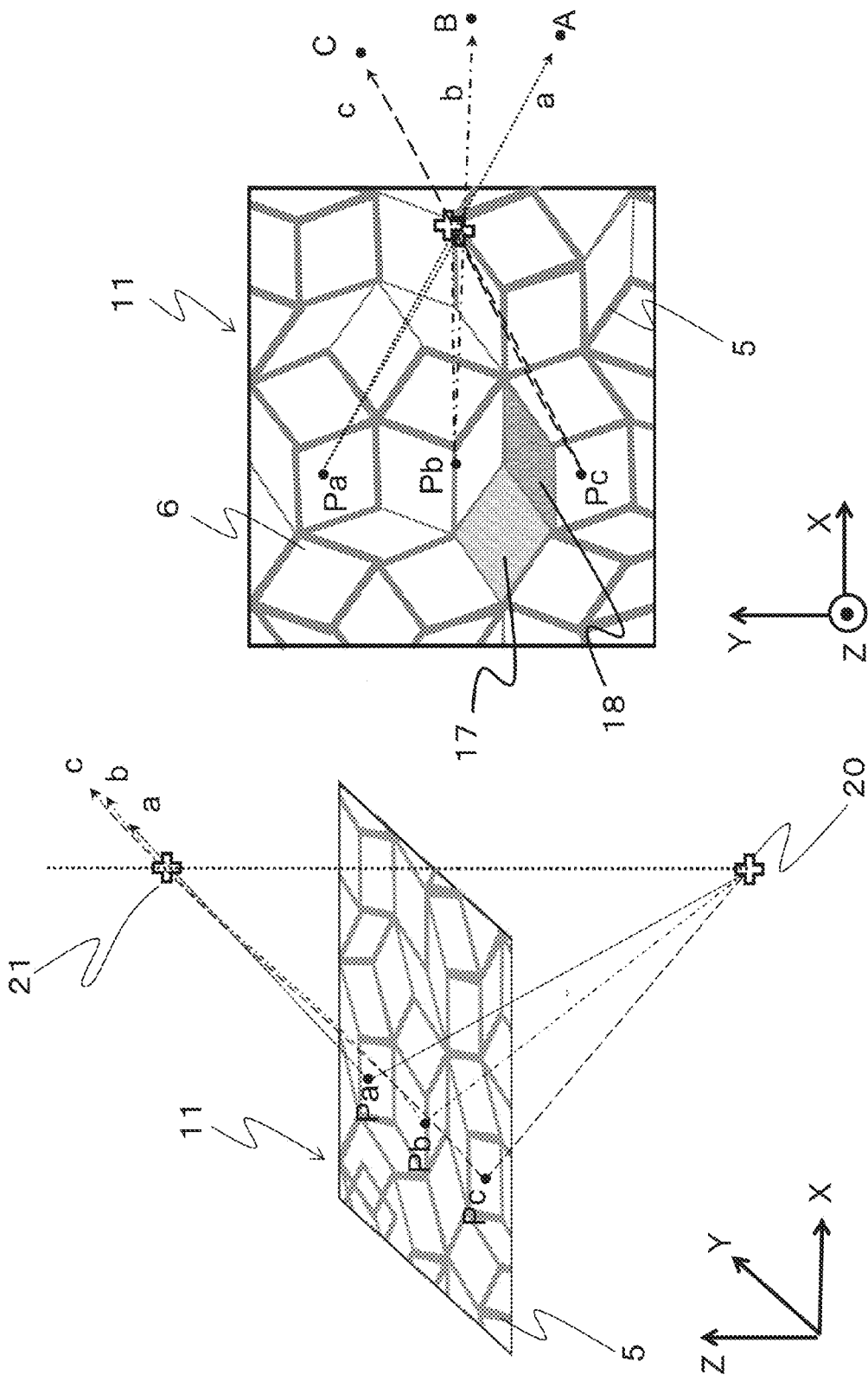
FIGS. 15A and 15B are schematic views illustrating the function of the optical element according to Embodiment 2.

The configuration according to Embodiment 2 of the invention will now be described. FIGS. 13 and 14 are perspective views of an optical element according to Embodiment 2, and FIGS. 15A and 15B are schematic views illustrating the function of the optical element according to Embodiment 2. FIG. 15A is a perspective view of a reflective optical element array 11 according to Embodiment 2, whereas FIG. 15B is a plan view of the reflective optical element array 11 according to Embodiment 2 when seen from the Z-axis direction. In the reflective optical element array 11 according to Embodiment 2, the respective shapes of the tiles 6 to 10 are different from those of the tiles 6 to 10 in the reflective optical element array 11 according to Embodiment 1. The other components are similar to those in Embodiment 1 described above, and hence the same components will be denoted by the same reference codes and will not be described here.

In the reflective optical element array 11 according to Embodiment 2, the tiles 6 to 10 are formed in the shapes in which the outer shapes on the XY plane of the tiles 6 to 10 include two or more types of geometric shapes. For example, each of the reflective optical element arrays 11 illustrated in FIGS. 13 and 14 is constituted by a rectangular tile 6 and triangular tiles 7 to 10. It is known that, in the case of dividing a plane into two or more types of geometric shapes, the plane may be divided into the geometric shapes arranged in a non-periodic manner if a combination of geometric shapes is selected. Thus, the reflective optical element array 11 illustrated in FIGS. 15A and 15B is called Penrose tiling, which can be divided into basic units 17 and 18 having two types of geometric shapes called "dart" and "kite". That is, the reflective optical element array 11 illustrated in FIGS. 15A and 15B are configured by arranging multiple tiles formed in the shapes of basic units 17 and 18 in a non-periodic manner. Other than the arrangement illustrated in FIGS. 15A and 15B, a large number of different arrangements of constituting a plane by arranging the geometric shapes in non-periodic manner may be known.

Also in the reflective optical element array 11 according to Embodiment 2, each of the tiles 6 to 10 is constituted by multiple reflective optical elements 1. Furthermore, the reflective optical elements 1 may be oriented in the same direction within the same one of the tiles 6 to 10 as illustrated in FIG. 13, or may be oriented in different directions on the XY plane within the same one of the tiles 6 to 10 as illustrated in FIG. 14. Moreover, an end surface (side surface) of each of the tiles 6 to 10 is provided with a light shielding part 5.

The reflective optical element array 11 illustrated in FIGS. 15A and 15B is configured by arranging multiple tiles, in which the outer shapes on the XY plane have two different types of geometric shapes (basic units 17 and 18), in a non-periodic manner. The tiles are non-periodically arranged, which complicates the contours of the boundaries between the tiles, resulting in an irregular arrangement of the light shielding part 5 located at the boundary between the tiles. Accordingly, as in Embodiment 1, the light rays a, b and c from the point light source 20 reflected respectively at the points Pa, Pb and Pc in the reflective optical element array 11 according to Embodiment 2 are all uniformly affected by the light shielding part 5. Therefore, the effect of the light shielding part 5 is equalized, thereby suppressing the variation in luminance of light rays a, b and c occurring when the observing point is moved around the Z-axis along points A, B and C. Further, a smaller number of types of tiles may be used to constitute the reflective optical element array 11 according to Embodiment 2, so that the number of types of tiles to be prepared may be reduced. For example, for the reflective optical element array 11 illustrated in FIGS. 15A and 15B, tiles having two types of geometric shapes may be sufficient. In Embodiment 2, therefore, the variation in luminance of the image 21 occurring in the case where the observing point is moved around the Z-axis, can be suppressed by a more simple design.

Next, a method of producing the reflective optical element array 11 according to Embodiment 2 will be described. The reflective optical element array 11 according to Embodiment 2 may be prepared by the LIGA process as in Embodiment 1 described above. In Embodiment 1, however, eleven types of tiles need to be prepared in the case of producing the reflective optical element array 11 illustrated in FIGS. 11A and 11B. According to Embodiment 2, on the other hand, only two types of tiles having the shapes of the basic units 17 and 18 need to be prepared in the case of producing the reflective optical element array 11 illustrated in FIGS. 15A and 15B. That is, according to Embodiment 2, the molded resin 24 with a surface on which the highly-reflective metal layer 25 is formed as illustrated in FIG. 12D is cut into parts having the shapes of the basic units 17 and 18 to prepare two types of tiles having these shapes. As for the prepared tiles, a cutting work or polishing work is applied to the rear surface side of the molded resin 24, and then the light shielding part 5 is formed on the side surface of each tile.

By combining the two types of thus-prepared tiles in accordance with the layout of FIGS. 15A and 15B, for example, the reflective optical element array 11 having a large area (size) and a small variation in luminance of the image occurring when the observing point is moved, can be obtained.

Embodiment 3

The configuration according to Embodiment 3 of the invention will now be described. Embodiment 3 is a modification example of Embodiment 1, with a configuration of each tile being different from that of Embodiment 1. The other components are similar to those in Embodiment 1, and the same components are denoted by the same reference codes and will not be described here.

As in Embodiment 1, the reflective optical element array 11 according to Embodiment 3 is constituted by multiple tiles in which the outer shapes on the XY plane of the tiles are triangular shapes while a light shielding part 5 is formed on the end surface (side surface) of each tile.

Figure 16:
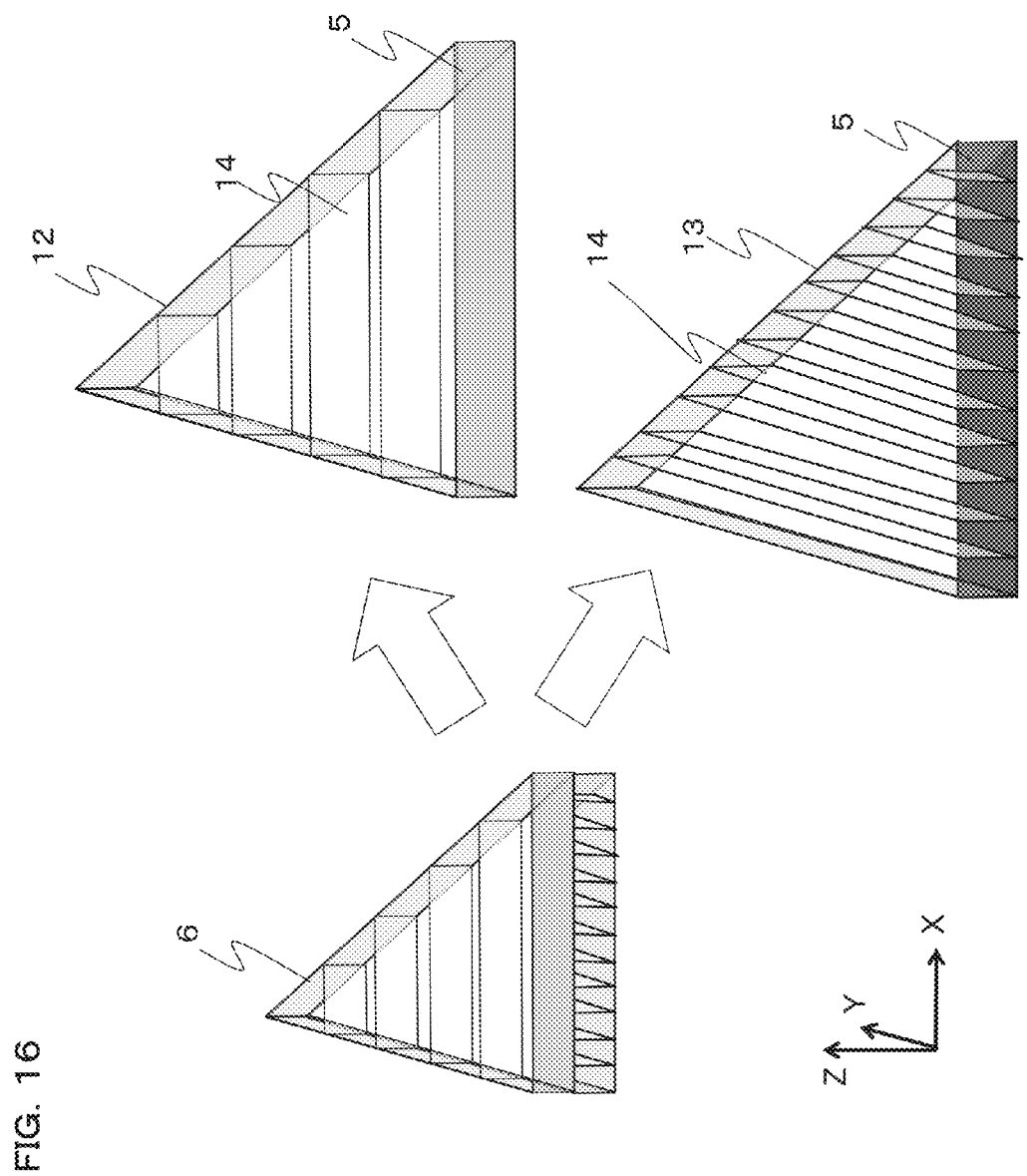
FIG. 16 is a perspective view of a tile according to Embodiment 3.

FIG. 16 is a perspective view of a tile according to Embodiment 3. In the reflective optical element array 11 according to Embodiment 3, each tile is constituted by an upper tile 12 and a lower tile 13 that are layered in the Z-axis direction. In FIG. 16, a tile 6 is illustrated at the left side, whereas a state where the upper tile 12 and the lower tile 13 are separated from each other is illustrated at the right side. In the tile 6 illustrated in FIG. 16, the upper tile 12 includes multiple mirrors (reflective optical elements) 14 extending in the X-axis direction and the lower tile 13 includes multiple mirrors (reflective optical elements) 14 extending in the Y-axis direction. The mirrors 14 in the upper tile 12 are arranged in parallel with the X-axis while their respective reflection surfaces are oriented orthogonal to the XY plane. The mirrors 14 in the lower tile 13 are arranged in parallel with the Y-axis while their respective reflection surfaces are oriented orthogonal to the XY plane. Here, the extending direction of the mirrors 14 in the upper tile 12 and the extending direction of the mirrors 14 in the lower tile 13 may arbitrarily be selected as any extending directions as long as they are orthogonal to each other.

Since the upper tile 12 and the lower tile 13 are layered in the Z-axis direction in the tile 6 according to Embodiment 3, the light ray from the point light source entering from the lower surface of the tile 6 is reflected once at the reflection surfaces of the mirrors 14 in the lower tile 13 and thereafter is further reflected at the reflection surfaces of the mirrors 14 in the upper tile 12. This allows the tile 6 according to Embodiment 3 to also attain the double reflection image 21 described with reference to FIGS. 3A and 3B.

Furthermore, the tiles in Embodiment 3 are formed in the shapes in which the outer shapes thereof on the XY plane are the triangular shapes based on the Delaunay triangulation as in Embodiment 1, so that the light shielding parts 5 located at the boundaries between the tiles are also irregularly arranged. Therefore, as in Embodiment 1, the variation in luminance of the image occurring when the observing point is moved around the Z-axis, can be suppressed.

Next, a method of producing the reflective optical element array 11 according to Embodiment 3 will be described. FIGS. 17A to 17E are schematic views illustrating a procedure of producing the optical element according to Embodiment 3. FIGS. 17A to 17E illustrate the appearances of the reflective optical element array 11 in each process of the production procedure. In Embodiment 3, first, a highly-reflective metal layer 25 is formed on a transparent substrate 26, and multiple transparent substrates 26 are prepared each having one surface on which the highly-reflective metal layer 25 is formed. Then, the transparent substrates 26 on which the highly-reflective metal layers 25 are respectively formed are adhered to one another such that the highly-reflective metal layers 25 thereon face the same direction, so as to form a layer stack 27 as illustrated in FIG. 17A.

Next, for example, the layer stack 27 is cut along cutting lines X-X' and Y-Y' as indicated by the broken lines in FIG. 17A to generate a thin piece of the layer stack 27, and one of the cut surfaces of the generated thin piece is polished.

Subsequently, the transparent substrate 26 is adhered to the polished cut surface of the thin piece and the other one of the cut surfaces of the thin piece is polished. This can obtain a thinned layer stack 28 illustrated in FIG. 17B.

Subsequently, two pieces of the thinned layer stacks 28 are made ready and the highly-reflective metal layers 25 of the two thinned layer stacks 28 are adhered to each other in the state where the extending directions (longitudinal directions) of the respective highly-reflective metal layers 25 are orthogonal to each other. Here, the two thinned layer stacks 28 may be bonded with the use of a photo-curable adhesive or the like. In this way, the configuration illustrated in FIG. 17C can be obtained. It is to be noted that one of the two thinned layer stacks 28 forms the upper tile 12 while the other one thereof forms the lower tile 13.

Thereafter, the thinned layer stacks 28 which are adhered to each other are divided into parts each having a shape of a Delaunay triangle which has been designed in advance by a cutting work, to prepare the tiles 6 to 10 having the respective triangular shapes. For example, in the case of producing the reflective optical element array 11 illustrated in FIGS. 11A and 11B, eleven different types of triangular tiles are prepared. FIG. 17D only illustrates the tile 6. In each of the prepared tiles 6 to 10, the highly-reflective metal layers 25 in the upper tile 12 and the lower tile 13 (thinned layer stacks 28) serve as mirrors 14 in the upper tile 12 and the lower tile 13 illustrated in FIG. 16.

Furthermore, the side surface of each of the prepared tiles are coated with black resin to form the light shielding part 5. For example, the light shielding process is performed by coating a tile with black coating material while masking the upper and lower surfaces of the tile. Thus, the tile 6 illustrated in FIG. 17E can be obtained.

The tiles 6 to 10 prepared as described above may be combined together in accordance with the layout illustrated in FIGS. 11A and 11B, for example, the reflective optical element array 11 having a large area (size) can be obtained. Furthermore, the obtained reflective optical element array 11 has a small variation in luminance associated with the movement of the observing point. Therefore, in the optical element constituted by tiling, variation in luminance of the image occurring when the observing point is moved can be suppressed.

Embodiment 4

Figure 18:
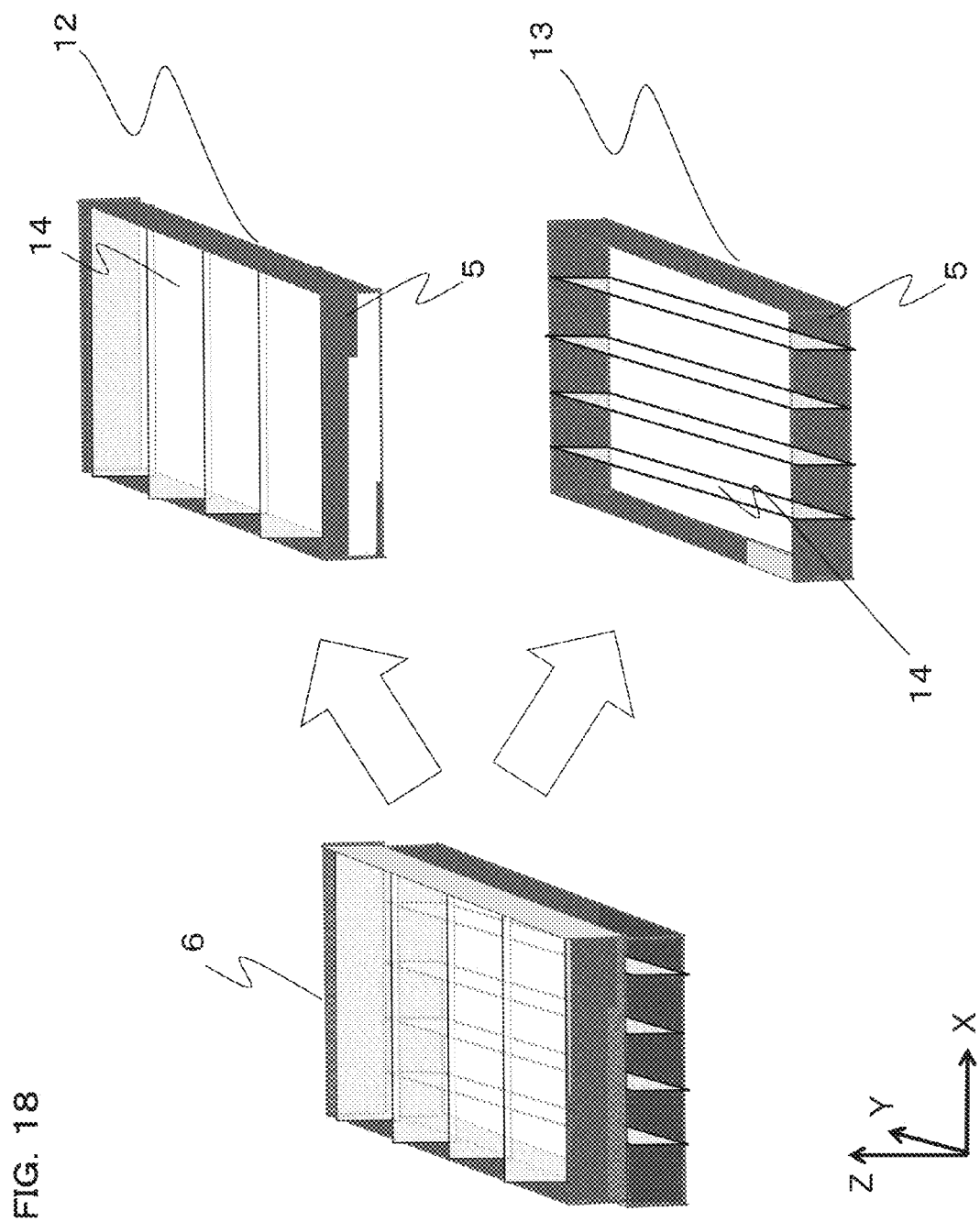
FIG. 18 is a perspective view of a tile according to Embodiment 4.

The configuration according to Embodiment 4 of the invention will now be described. Embodiment 4 is a modification example of Embodiment 2, in which the configuration of each tile is different from that in Embodiment 2 but is similar to that in Embodiment 3. The other components are similar to those in Embodiment 2, which will be denoted by the same reference codes and will not be described here. FIGS. 18 and 19 are perspective views of tiles according to Embodiment 4, each illustrating the tile 6 on the left side and the state where the upper tile 12 and lower tile 13 are separated from each other on the right side.

As in Embodiment 2, the tiles 6 to 10 according to Embodiment 4 are formed in the shapes in which the outer shapes on the XY plane are two or more types of geometric shapes (basic units 17 and 18). For example, the tile 6 illustrated in FIG. 18 is formed in the shape of the basic unit 17 illustrated in FIGS. 15A and 15B, whereas the tile 6 illustrated in FIG. 19 is formed in the shape of the basic unit 18 illustrated in FIGS. 15A and 15B. Moreover, the reflective optical element array 11 according to Embodiment 4 is configured by arranging the tiles 6 to 10 in a non-periodic manner, as in Embodiment 2. Each of the tiles 6 to 10 according to Embodiment 4 has the upper tile 12 and the lower tile 13 layered in the Z-axis direction, as in Embodiment 3, the upper tile 12 and the lower tile 13 including multiple mirrors 14 extending in the X-axis direction and the Y-axis direction, respectively. In Embodiment 4, the extending direction of the mirrors 14 in the upper tile 12 and the extending direction of the mirrors 14 in the lower tile 13 may appropriately be selected as long as they are orthogonal to each other.

According to the configuration as described above, it is possible to obtain the double reflection image 21 described with reference to FIGS. 3A and 3B in the tiles 6 to 10 of Embodiment 4.

Also in Embodiment 4, since the tiles 6 to 10 are arranged in a non-periodic manner, the light shielding parts 5 located at the boundaries between the tiles 6 to 10 are also irregularly arranged, as in Embodiment 2. Therefore, variation in luminance of an image occurring when the observing point is moved around the Z-axis may be suppressed. The configuration with a smaller number of types of tiles is possible also in the reflective optical element array 11 according to Embodiment 4, which can reduce the number of types of tiles to be prepared.

Next, a method of producing the reflective optical element array 11 according to Embodiment 4 will be described. The reflective optical element array 11 in Embodiment 4 may be prepared by a production procedure similar to that in Embodiment 3 described above. In Embodiment 4, however, two thinned layer stacks 28 that are bonded to each other as illustrated in FIG. 17C are cut into the shapes of the basic units 17 and 18 to prepare two types of tiles with the respective shapes. Hence, in Embodiment 4, only two types of tiles having the shapes of the basic units 17 and 18 may be sufficient. Note that the light shielding part 5 is formed on the side surface of each of the prepared tiles.

By combining thus prepared two types of tiles in accordance with the layout in FIGS. 15A and 15B, for example, the reflective optical element array 11 having a large area (size) can be obtained. Furthermore, the obtained reflective optical element array 11 has a small variation in luminance associated with the movement of the observing point. Thus, in the optical element configured by tiling, variation in luminance of the image occurring when the observing point is moved, can be suppressed.

Embodiment 5

Figure 20:
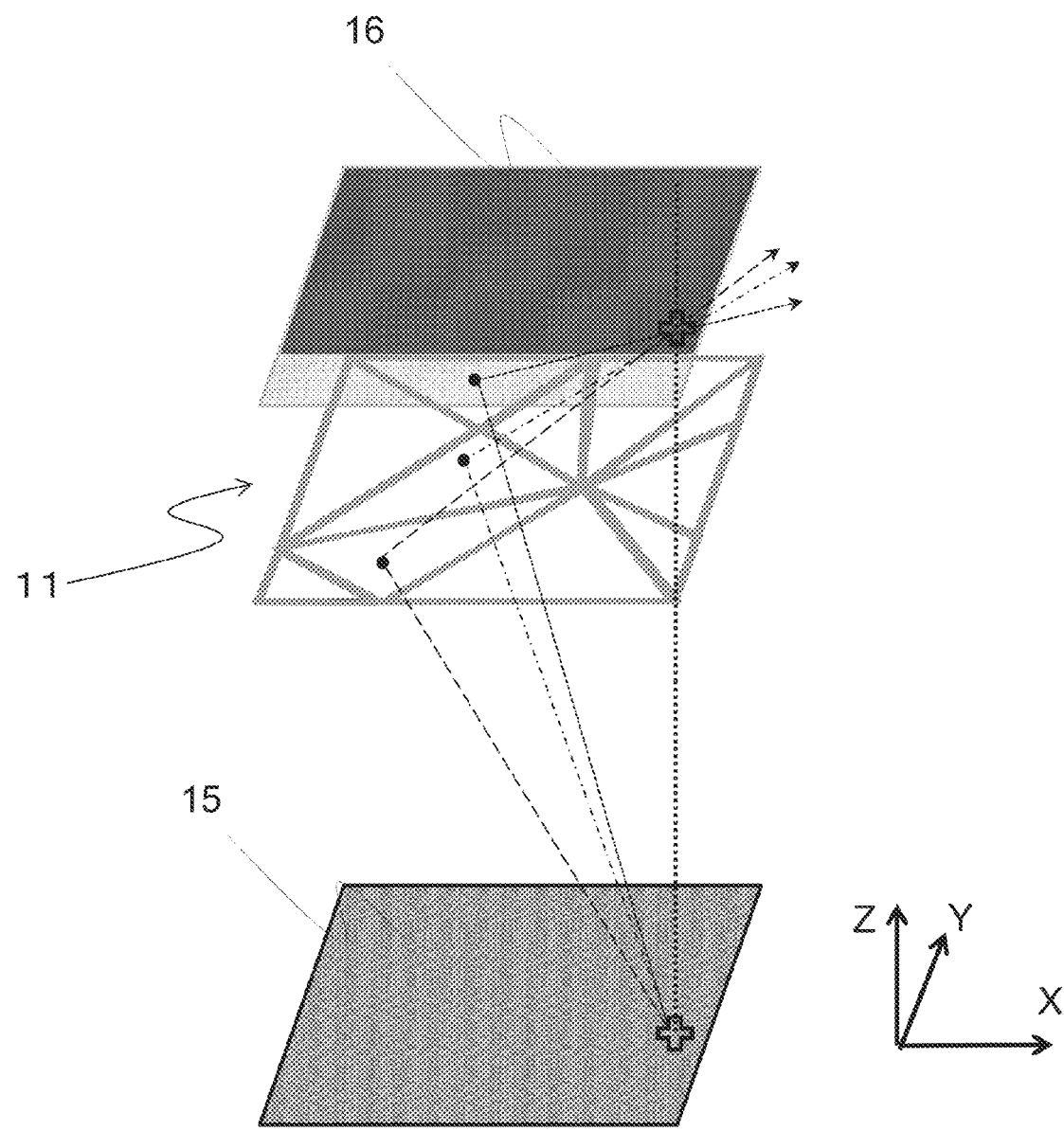
FIG. 20 is a perspective view of a display apparatus according to Embodiment 5.

The configuration according to Embodiment 5 of the invention will now be described. In Embodiment 5, a display apparatus according to the disclosure is described. FIG. 20 is a perspective view of a display apparatus according to Embodiment 5. The display apparatus according to Embodiment 5 comprises the reflective optical element array 11 according to any one of Embodiments 1 to 4 described above, and a display device 15. In the display apparatus illustrated in FIG. 20, the display device 15 is located below the reflective optical element array 11. As the display device 15, a liquid crystal display panel, an organic electroluminescence (EL) panel or the like may be employed.

The light rays emitted from respective points in the display device 15 are reflected at the reflective optical element array 11 and thereafter forms a display device image 16, as illustrated in FIG. 20. By changing the content displayed on the display device 15, the content of the display device image 16 may be changed.

Since the variation in luminance associated with the movement of the observing point which is centered around the Z-axis is small in the reflective optical element array 11 according to each of Embodiments 1 to 4, if the display device image 16 is observed while the display device 15 is located below the reflective optical element array 11, no variation in luminance of the display device image 16 can be observed even when the observing point is moved.

Accordingly, in the display apparatus according to Embodiment 5, the display device image 16 which variation in luminance has been suppressed can be obtained.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

It is noted that, as used herein and in the appended claims, the singular forms "a", "an", and "the" include plural referents unless the context clearly dictates otherwise.

What is claimed is:

1. An optical element including a plurality of tiles each constituted by a plurality of reflective optical elements and having a plane surface, wherein,
    outer shapes on the plane surface of the tiles have at least two different triangular shapes,
    an end surface of each of the tiles is provided with a light shielding part,
    each of the tiles includes an upper tile and a lower tile layered in a direction perpendicular to the plane surface,
    the reflective optical elements in the upper tile correspond to a plurality of mirrors extending in one direction, and
    the reflective optical elements in the lower tile correspond to a plurality of mirrors extending in a direction orthogonal to the one direction.

2. The optical element according to claim 1, wherein each of the reflective optical elements has a shape of a quadrangular prism with a square bottom surface, has at least two adjacent side surfaces serving as reflection surfaces, and is arranged with an axis aligned in a direction perpendicular to the plane surface.

3. The optical element according to claim 1, wherein,
    the mirrors in the upper tile are arranged with respective reflection surfaces orthogonal to the plane surface and are arranged in parallel with one direction on the plane surface, and
    the mirrors in the lower tile are arranged with respective reflection surfaces orthogonal to the plane surface and are arranged in parallel with a direction orthogonal to the one direction on the plane surface.

4. An optical element including a plurality of tiles each constituted by a plurality of reflective optical elements and having a plane surface, wherein,
    outer shapes on the plane surface of the tiles have at least two different geometric shapes and the tiles are arranged non-periodically on the plane surface, and
    an end surface of each of the tiles is provided with a light shielding part,
    each of the tiles includes an upper tile and a lower tile layered in a direction perpendicular to the plane surface,
    the reflective optical elements in the upper tile correspond to a plurality of mirrors extending in one direction, and
    the reflective optical elements in the lower tile correspond to a plurality of mirrors extending in a direction orthogonal to the one direction.

5. The optical element according to claim 4, wherein each of the reflective optical elements has a shape of a quadrangular prism with a square bottom surface, has at least two adjacent side surfaces serving as reflection surfaces, and is arranged with an axis aligned in a direction perpendicular to the plane surface.

6. The optical element according to claim 4, wherein,
    the mirrors in the upper tile are arranged with respective reflection surfaces orthogonal to the plane surface and are arranged in parallel with one direction on the plane surface, and
    the mirrors in the lower tile are arranged with respective reflection surfaces orthogonal to the plane surface and are arranged in parallel with a direction orthogonal to the one direction on the plane surface.

7. A display apparatus, comprising:
    the optical element according to claim 1; and
    a display device.

8. An optical element comprising:
    a plurality of tiles, each tile constituted by a plurality of reflective optical elements, the optical element formed in a flat plate shape having plane surfaces facing each other, wherein,
    light is incident on one of the plane surfaces and is emitted from the other of the plane surfaces,
    outer shapes on the plane surface of the tiles have at least two different triangular shapes, and
    an end surface of each of the tiles is provided with a light shielding part.

9. An optical element comprising:
    a plurality of tiles, each tile constituted by a plurality of reflective optical elements, the optical element formed in a flat plate shape having plane surfaces facing each other, wherein,
    light is incident on one of the plane surfaces and is emitted from the other of the plane surfaces,
    outer shapes on the plane surface of the tiles have at least two different geometric shapes and the tiles are arranged non-periodically on the plane surface, and
    an end surface of each of the tiles is provided with a light shielding part.

* * * * *